US008533154B2

(12) United States Patent
Huang et al.

(10) Patent No.: US 8,533,154 B2
(45) Date of Patent: *Sep. 10, 2013

(54) METHOD AND SYSTEM FOR SERVER SYNCHRONIZATION WITH A COMPUTING DEVICE

(75) Inventors: Xiao Fei Huang, Foster City, CA (US); Magnus Vejlstrup, San Francisco, CA (US); David L. Rabbers, Newcastle, WA (US); Pi-Yu Chung, Bellevue, WA (US); Martin Susser, University Place, WA (US); Aaron B. Hansen, Issaquah, WA (US); Brian Scott, Renton, WA (US); David J. George, Bellevue, WA (US)

(73) Assignee: Siebel Systems, Inc., San Mateo, CA (US)

( * ) Notice: Subject to any disclaimer, the term of this patent is extended or adjusted under 35 U.S.C. 154(b) by 842 days.

This patent is subject to a terminal disclaimer.

(21) Appl. No.: 11/753,290

(22) Filed: May 24, 2007

(65) Prior Publication Data

US 2007/0226272 A1  Sep. 27, 2007

Related U.S. Application Data

(63) Continuation of application No. 10/084,257, filed on Feb. 25, 2002, now Pat. No. 7,761,535, which is a continuation-in-part of application No. 09/282,001, filed on Sep. 28, 2001, now Pat. No. 7,415,539.

(51) Int. Cl.
*G06F 7/00* (2006.01)
*G06F 15/16* (2006.01)

(52) U.S. Cl.
USPC .......................................... 707/610; 709/248

(58) Field of Classification Search
USPC ................ 709/201–203, 248; 707/103, 610, 707/201
See application file for complete search history.

(56) References Cited

U.S. PATENT DOCUMENTS

| 5,640,566 A | 6/1997 | Victor et al. |
| 5,684,990 A | 11/1997 | Boothby |

(Continued)

FOREIGN PATENT DOCUMENTS

| WO | WO 98/38583 | 9/1998 |
| WO | WO 98/40805 | 9/1998 |

(Continued)

OTHER PUBLICATIONS

Seshadri, Praveen and Phil Garrett, Microsoft Corporation; "SQL Server for Windows CE—A Database Engine for Mobile and Embedded Platforms," printed Jan. 16, 2008.

(Continued)

*Primary Examiner* — Ian N Moore
*Assistant Examiner* — Kiet Tang
(74) *Attorney, Agent, or Firm* — Campbell Stephenson LLP

(57) ABSTRACT

A method and system for synchronizing a main database of a server and a local database of a handheld device. A user can use an application residing in the handheld device to make transactions in the local database. During a synchronization operation, the handheld device and server are coupled. The system then determines whether the application should be updated and, if so, causes the server to provide an update. The system also causes the handheld device to provide to the server information related to the transactions made by the user to the local database. The system causes the server to perform transactions on the main database based on the transaction information. The system also causes the server to extract data from the main database. The server can then provide at least some of the extracted data to the handheld device to update the local database.

21 Claims, 17 Drawing Sheets

(56) References Cited

U.S. PATENT DOCUMENTS

| | | | |
|---|---|---|---|
| 5,812,819 A | 9/1998 | Rodwin et al. | |
| 5,831,664 A | 11/1998 | Wharton et al. | |
| 5,845,293 A | 12/1998 | Veghte | |
| 5,857,201 A | 1/1999 | Wright, Jr. et al. | |
| 5,862,327 A | 1/1999 | Kwang et al. | |
| 5,867,688 A | 2/1999 | Simmon et al. | |
| 5,974,238 A | 10/1999 | Chase, Jr. | |
| 5,991,771 A | 11/1999 | Falls et al. | |
| 6,000,000 A * | 12/1999 | Hawkins et al. | 707/610 |
| 6,002,852 A | 12/1999 | Birdwell et al. | |
| 6,006,274 A | 12/1999 | Hawkins et al. | |
| 6,044,381 A * | 3/2000 | Boothby et al. | 707/201 |
| 6,085,198 A * | 7/2000 | Skinner et al. | 707/103 |
| 6,189,011 B1 | 2/2001 | Lim et al. | |
| 6,205,448 B1 | 3/2001 | Kruglikov et al. | |
| 6,212,529 B1 | 4/2001 | Boothby et al. | |
| 6,216,135 B1 | 4/2001 | Brodersen et al. | |
| 6,233,577 B1 | 5/2001 | Ramasubramani et al. | |
| 6,233,600 B1 | 5/2001 | Salas et al. | |
| 6,233,617 B1 | 5/2001 | Rothwein et al. | |
| 6,237,024 B1 | 5/2001 | Wollrath et al. | 709/203 |
| 6,243,468 B1 | 6/2001 | Pearce et al. | |
| 6,269,369 B1 | 7/2001 | Robertson | |
| 6,272,545 B1 | 8/2001 | Flanagin et al. | |
| 6,295,541 B1 | 9/2001 | Bodnar et al. | |
| 6,317,754 B1 | 11/2001 | Peng | |
| 6,317,797 B2 | 11/2001 | Clark et al. | |
| 6,330,715 B1 | 12/2001 | Razzaghe-Ashrafi | |
| 6,374,245 B1 | 4/2002 | Park | |
| 6,393,434 B1 | 5/2002 | Huang et al. | |
| 6,405,218 B1 | 6/2002 | Boothby et al. | |
| 6,470,358 B1 * | 10/2002 | Beyda et al. | 707/201 |
| 6,477,543 B1 | 11/2002 | Huang et al. | |
| 6,564,263 B1 | 5/2003 | Bergman et al. | |
| 6,606,649 B1 | 8/2003 | Schwitters et al. | |
| 6,611,849 B1 | 8/2003 | Raff et al. | |
| 6,636,873 B1 | 10/2003 | Carini et al. | |
| 6,647,267 B1 | 11/2003 | Britt et al. | |
| 6,694,335 B1 | 2/2004 | Hopmann et al. | |
| 6,694,336 B1 | 2/2004 | Multer et al. | |
| 6,718,348 B1 | 4/2004 | Novak et al. | |
| 6,721,787 B1 | 4/2004 | Hiscock | |
| 6,829,655 B1 | 12/2004 | Huang et al. | |
| 6,832,239 B1 | 12/2004 | Kraft et al. | |
| 6,839,744 B1 | 1/2005 | Kloba et al. | |
| 6,862,617 B1 | 3/2005 | Wu | |
| 7,613,834 B1 * | 11/2009 | Pallipuram et al. | 709/248 |
| 2001/0055017 A1 | 12/2001 | Ording | |
| 2002/0010807 A1 | 1/2002 | Multer et al. | |
| 2002/0029227 A1 | 3/2002 | Multer et al. | |
| 2002/0052952 A1 | 5/2002 | Yoshida et al. | |
| 2002/0056011 A1 | 5/2002 | Nardone et al. | |
| 2003/0023759 A1 | 1/2003 | Littleton et al. | |

FOREIGN PATENT DOCUMENTS

| | | |
|---|---|---|
| WO | WO 02/080015 A1 | 10/2002 |
| WO | WO 2004/084082 A1 | 9/2004 |

OTHER PUBLICATIONS

PCT Notification of Transmittal of International Search Report for PCT Counterpart Application No. PCT/US03/05753 Containing International Search Report; May 7, 2003; 3 pages.

PCT Notification of Transmittal of International Search Report for PCT Counterpart Application No. PCT/US02/09161 Containing International Search Report; May 31, 2002; 5 pages.

N. Borenstein, RFC 1521, MIME (Multipurpose Internet Mail Extensions) Part One, Chapter 5; Sep. 1993; 11 pages.

Zhiming Ding, et al., "A Novel Conflict Detection and Resolution Strategy Based on TLRSP in Replicated Mobile Database Systems," 2001; 7 pages.

Wai Gen Yee, et al., "Scaling Replica Maintenance in Intermittently Synchronized Mobile Databases;" CIKM '01; Nov. 5-10, 2001; pp. 450-457.

PCT Notification of Transmittal of International Search Report for PCT Counterpart Application No. PCT/US03/05773 Containing International Search Report; Feb. 25, 2002; 3 pages.

* cited by examiner

METHOD AND SYSTEM FOR SERVER SYNCHRONIZATION WITH A COMPUTING DEVICE

CROSS REFERENCE TO RELATED APPLICATIONS

This application is a continuation of U.S. patent application Ser. No. 10/084,257, filed on Feb. 25, 2002, now U.S. Pat. No. 7,761,535 entitled "METHOD AND SYSTEM FOR SERVER SYNCHRONIZATION WITH A COMPUTING DEVICE," which is a continuation-in-part of U.S. patent application Ser. No. 09/967,439, filed on Sep. 28, 2001 now U.S. Pat. No. 7,415,539 entitled "METHOD AND SYSTEM FOR CLIENT-BASED OPERATIONS IN SERVER SYNCHRONIZATION WITH A COMPUTING DEVICE," and is incorporated by reference herein in its entirety and for all purposes.

TECHNICAL FIELD

This disclosure relates generally to computer systems, and in particular but not exclusively, relates to transferring data from one computer system into another.

BACKGROUND

Portable computing devices (also referred to herein as handheld devices) such as personal digital assistants (PDAs) available from vendors such as Palm, Handspring, Hewlett Packard, Sony, Casio, Psion, have found increasing acceptance in the business world. Some users have a need to use their handheld devices to interact with enterprise business applications such as those offered by Siebel Systems, Inc., Oracle Corporation and others. These enterprise business applications can include large databases that a number of user may access and/or update at any time.

Providing access to enterprise business applications through a handheld device can encounter significant problems due to the relatively limited amount of computing power, energy storage and memory available on typical handheld devices. For example, a user may wish to extract data that resides in a server used in supporting an enterprise business application. In view of the limited resources of the handheld device, it is generally desirable that the handheld device be designed and configured to efficiently receive the extracted data.

SUMMARY

In accordance with aspects of the present invention, a system includes a server and a handheld device. A user can use an application residing in the handheld device to make transactions in the local database. In one aspect of the invention, during a synchronization operation, the handheld device and server are coupled. The system then determines whether the application should be updated and, if so, causes the server to provide an update. In one embodiment, the server provides the update by sending metadata. The system also causes the handheld device to provide to the server information related to the transactions made by the user to the local database. The system causes the server to perform transactions on the main database based on the transaction information. Further, the system causes the server to extract data from the main database. The server can then provide at least some of the extracted data to the handheld device to update the local database.

DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE PREFERRED EMBODIMENTS

Embodiments of a system and method for synchronizing a handheld device with a server are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

System Overview

Figure 1:
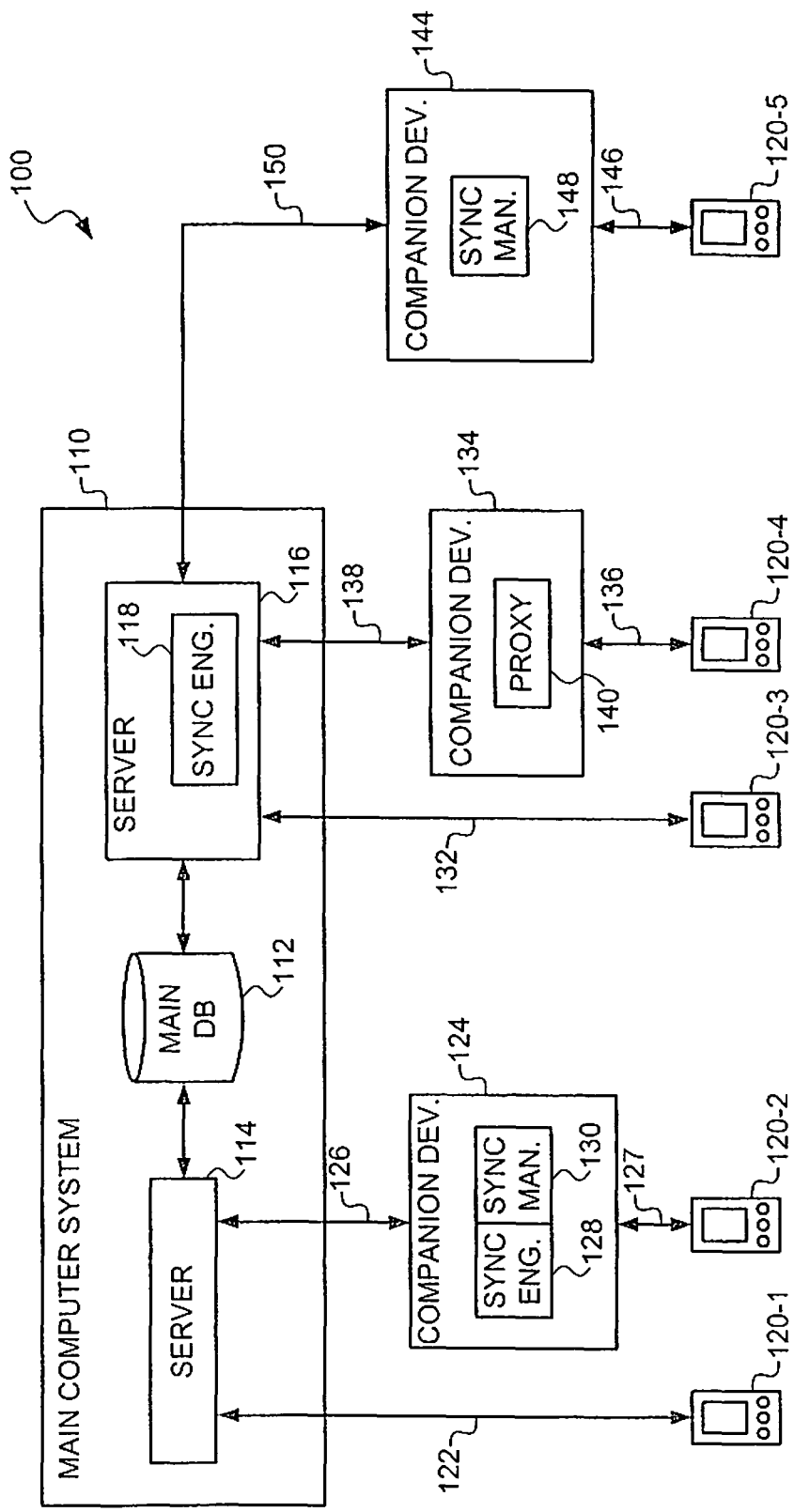
FIG. 1 is a block diagram illustrating a system having a main database that is accessible to users through handheld devices, in accordance with one embodiment of the present invention.

FIG. 1 illustrates a system 100 having a database that is accessible to users through handheld devices, in accordance with one embodiment of the present invention. System 100 includes a main computer system 110 having a main database 112 and a server connected to database 112. In a first possible embodiment, the server is implemented with a server 114. In a second possible embodiment, the server is implemented with a server 116 that includes a synchronization engine (sync engine) 118. In a third possible embodiment, main computer system 110 may include both server 114 and server 116. Servers 114 and 116 are both shown in FIG. 1 for convenience; however, one of the servers may be omitted in the aforementioned first and second embodiments.

System 100 also includes handheld devices that users may use to remotely access main database 112. Handheld devices 120-1, 120-2, 120-3, 120-4 and 120-5 are shown in FIG. 1. When server 114 is present in system 100, a user may remotely access main database 112 using handheld device 120-1 via a connection 122 to server 114. In one embodiment, connection 122 is implemented using a standard telephone modem and the serial interface defined by the handheld device manufacturer.

Alternatively, a user may remotely access main database 112 via an intermediary computing device (also referred to herein as a companion device) 124, which is connected to server 114 via a connection 126. Typically, companion device 124 is a more powerful computing device (i.e., having more memory, a processor with better performance, a larger power supply, etc.) than typical handheld devices. For example, a companion device may be a desktop or notebook computer. Handheld device 120-2 and companion device 124 transfer information over a connection 127. In one embodiment, connection 127 is implemented using a serial interface typically provided with the handheld device. For example, connection 127 may be implemented using a serial port, parallel port, or other bus protocol. Some handheld devices include a cradle assembly that provides the physical interconnection between the handheld device and a companion device.

In this embodiment, companion device 124 includes synchronization engine (sync engine) 128 and a synchronization manager (sync manager) 130. Sync engine 128 performs a similar function as sync engine 118 of server 116. In some embodiments, sync manager 130 and sync engines 118 and 128 are implemented in software that is executed by one or more processors of companion device 124 or server 116. Further, although not shown in FIG. 1, this embodiment of handheld device 120-1 includes a sync engine and sync manager serving essentially the same functions as sync engine 128 and sync manager 130.

When server 116 is present in main computer system 110, a user may access main database 112 using handheld device 120-3 via a connection 132 to server 116. Connection 132 can be a telephone modem connection as previously described for connection 122, or any other type of connection supported by both server 116 and handheld device 120-3. Although not shown, this embodiment of handheld device 120-3 includes a sync manager that provides essentially the same functions as sync manager 130. As previously described, server 116 includes sync engine 118, allowing devices that access main database 112 via server 116 to dispense with having their own sync engines.

Alternatively, a user may access main database 112 using handheld device 120-4 through a companion device 134, which is connected to handheld device via a connection 136. Connection 136 is typically the serial interface that is provided by the handheld device vendor. Companion device 134 is connected to server 116 via a connection 138. In this embodiment, handheld device 120-4 includes a sync manager component (not shown) similar to that of handheld device 120-3. Companion device 134 includes an interface component (also referred to herein as a proxy) 140 that allows data transfers between server 116 and handheld device 120-4, which may be different. For example, in one embodiment connection 138 (i.e., the server-companion device connection) may be a HTTP (hyper text transport protocol) connection (e.g., an Internet connection) while connection 136 (i.e., the companion device-handheld device connection) may be a proprietary handheld device synchronization connection (e.g., a serial bus). Thus, interface component 140 serves, in effect, as a proxy between server 116 and handheld device 120-4.

Still further, a user may access main database 112 using handheld device 120-5 through a companion device 144, which is connected to handheld device 120-5 via a connection 146. In this embodiment, companion device 144 includes a sync manager 148, which communicates with server 116 via a connection 150. Sync manager 148 of companion device 144 allows handheld device 120-5 to dispense with having a sync manager component.

In practice, several users may access main database 112 using a handheld device via each of the five above paths (i.e., communication paths between main database 112 and handheld devices 120-1 through 120-5). Thus, for example, although only one handheld device 120-3 is shown in FIG. 1 as directly coupled to server 116, several users can access main database 112 in the essentially the same way using handheld devices that are configured in the substantially the same way as handheld device 120-3.

Further, other embodiments of system 100 may be implemented with various combinations or permutations of the five paths described above. For example, system 100 may be implemented to support only the paths between main database 112 and handheld devices 120-3 (via server 116 and direct connection 132) and 120-4 (via server 116 and companion device 134). This exemplary embodiment allows a handheld device that is configured with a sync manager to perform either a direct synchronization or a companion synchronization (via proxy 140).

In addition, although telephone modem, HTTP, and standard handheld synchronization connections are described above, any suitable connection can be used in other embodiments. For example, other embodiments may use protocols other than HTTP. In addition the signal propagation mediums used by the connections may be wired (e.g., using mediums such as twisted pair, cable, and optical fiber) or wireless (e.g., using technologies such as infrared, radio-frequency and optical technologies).

One of the functions of system 100 is to synchronize selected information between main computer system 110 and a handheld device. For example, the information may be database data stored in main database 112 and a local database (not shown) in a handheld device. During operation of system 100, the database data is updated frequently by users. The updated database data is distributed to users via synchronization processes. In addition, the information to be synchronized may include definitions (also referred to herein as metadata) used by an application executed in the handheld device. Some of the operations performed during a synchronization process are described below in conjunction with FIG. 2.

Figure 2:
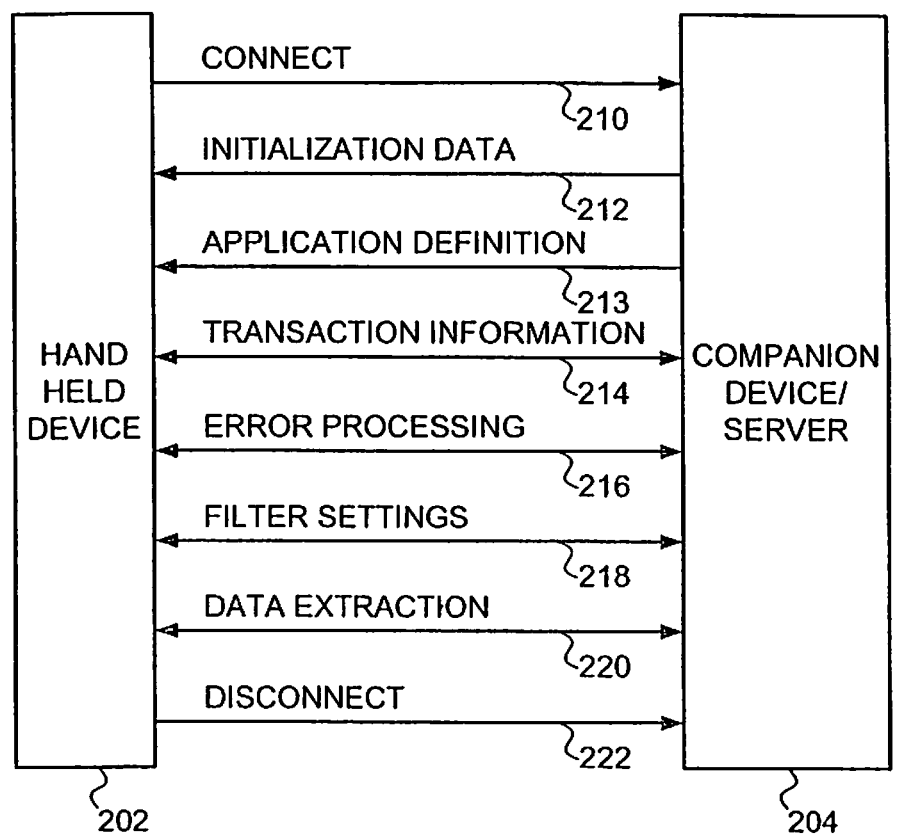
FIG. 2 is a diagram illustrating dataflow between a handheld device and another computer system, according to one embodiment of the present invention.

FIG. 2 illustrates dataflow between a handheld device 202 and another computer system 204 in synchronizing data, according to one embodiment of the present invention. For example, computer system 204 may be implemented by: (a) one of servers 114 or 116; or (b) companion device 124; or (c) companion device 134 combined with one of servers 114 or 116; or (d) companion device 144 combined with one of servers 114 or 116. Some specific implementations of the dataflow operations in FIG. 2 are described in conjunction with FIGS. 3-11 below.

Referring back to FIG. 2, handheld device 202 can initiate a connection with computer system 204 as indicated by arrow 210 in FIG. 2. In one embodiment, handheld device 202 initiates this connection with computer system 204 by logging in using a modem (e.g., via an Internet connection). For example, this connection may be a standard HTTP connection. In another embodiment, handheld device 202 may initiate this connection with a companion device using the synchronization interface application and hardware provided by the handheld device vendor. For example, this connection may be initiated when the user places handheld device 202 into a supplied cradle accessory and activates a synchronization button on the cradle.

In this embodiment, computer system 204 then provides initialization data to handheld device 202, and indicated by arrow 212 in FIG. 2. In one embodiment, the initialization information can include information related to the latest version of main database 112. For example, a new table may have added to main database 112. In addition, the initialization information may include information related to the most recent transaction (see description below) uploaded to computer system 204. In one embodiment, handheld device 202 pulls this initialization information after the connection is established. Alternatively, computer system 204 may push the initialization information to handheld device 202 in response to the connection being established.

As shown by an arrow 213 in FIG. 2, computer system 204 can then transfer application definition information to handheld device 202. In one embodiment, this application definition information can include information related to definitions used in the application that the user uses to access the local database of handheld device 202 (also referred to herein as the handheld application). For example, this application definition information can include the views and screens displayed by the handheld application in providing a user interface. In one embodiment, handheld device 202 determines if its local application definition needs to be updated (using the initialization information) and if so, pulls this information from computer system 204. In other embodiments, computer system 204 may receive information from handheld device 204 that indicates the version of its application definition. Computer system 204 can then determine whether handheld device 202 needs updated application definition information, and if so, push the updated application definition to handheld device 202.

Handheld device 202 can transfer transaction information to computer system 204, as indicated by an arrow 214 in FIG. 2. In one embodiment, all of the local database transactions entered into handheld device 202 by the user are recorded. This recorded transaction information is transferred to computer system 204, which then performs the transactions in main database 112 (FIG. 1). In some embodiments, handheld device 202 transfers the transaction information in one block to computer system 204. After the entire block has been received, computer system 204 would determine whether the block was properly received. In other embodiments, handheld device 202 transfers the transaction information in a number of relatively small blocks. After each small block is received, computer system 204 can determine whether that block was properly received and send a message or signal to handheld device 202 to either retransmit that block or send the next block. Thus, if there is a problem or interruption during the transfer, handheld device 202 need only transfer the blocks that have not been properly received, rather than retransmitting all of the transaction information.

Computer system 204 can then transfer error information to handheld device 202, as indicated by an arrow 216 in FIG. 2. In one embodiment, this error information includes: (a) information on transactions that system 100 (FIG. 1) does not permit the user to make transactions on data that was also changed by other one or more other users; and (b) information on changes made to the transactions by the server. The user can then manually correct or dispose of these errors on handheld device 202.

In addition, handheld device 202 and computer system 204 can update filter settings, as shown by arrow 218 in FIG. 2. The filter settings are set so that unwanted or unneeded information is not transferred between handheld device 202 and computer system 204, thereby conserving limited resources on handheld device 202. In this embodiment, a user can update filter settings for handheld device 202 and then upload them to computer system 204. Thus, computer system 204 can then avoid downloading information that the user does not want. Further, in this embodiment, computer system 204 processes the filter settings received from handheld device 202 to ensure that the filter settings are proper. For example, the user may have attempted to filter out information that is required by an application running on handheld device 202 to properly execute.

Computer system 204 can then transfer database data to handheld device 202, as indicated by an arrow 220 in FIG. 2. This operation is also referred to herein as "data extraction." In one embodiment, computer system 204 forms an image of all of the database data that is visible to handheld device 202 and after being filtered. This image is also referred to herein as an extract. Computer system 204 then downloads this extract to handheld device 202. In one embodiment, computer system 204 downloads the extract in a series of relatively small blocks, with handheld device 202 acknowledging the reception of each small block.

In another embodiment, computer system 204 stores the extract after each download. On the next data extraction operation, computer system 204 can compare the current extract with the previous extract and download only the database data that has changed (also referred to herein as a delta extract). The previous extract can then be deleted. In a further refinement, in certain circumstances, computer system 204 may ignore the previous extract and, instead, download the entire current extract. For example, if the structure of main database 112 (FIG. 1) changed since the previous extract, then computer system 204 would then perform a full extract rather than attempt to perform a delta extract. Handheld device 202 can then disconnect from computer system 204, as indicated by an arrow 222 in FIG. 2.

Figure 3:
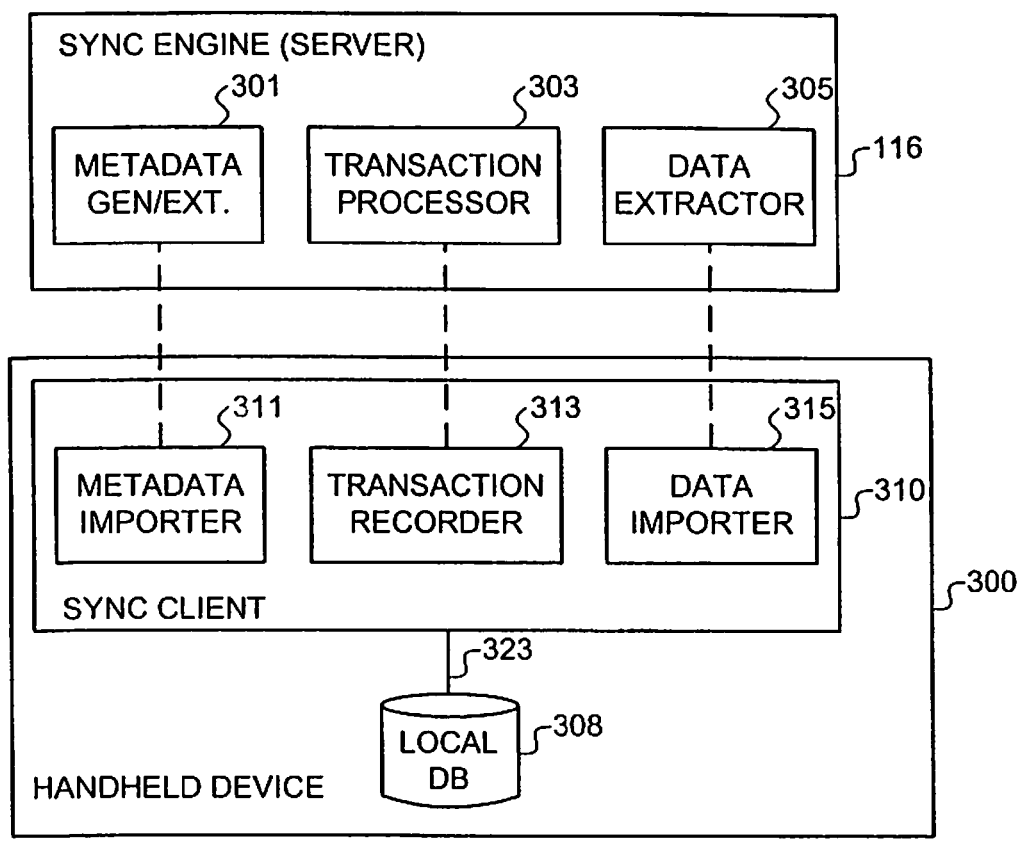
FIG. 3 is a top-level block diagram illustrating components of a server and a client used in synchronizing a handheld device, according to one embodiment of the present invention.

FIG. 3 illustrates components of sync engine 116 (FIG. 1) and a handheld device 300 used in a synchronizing operation, according to one embodiment of the present invention. Handheld device 300 can be used to implement any of handheld devices 120-3 through 120-5 (FIG. 1).

In this embodiment, sync engine 116 includes a metadata extractor 301, a transaction processor 303 and a data extractor 305. Handheld device 300 includes a local database 308 and a synchronization client (sync client) 310 having a metadata importer 311, a transaction recorder 313 and a data importer 315. In this embodiment, sync client 310 and its components are implemented in software.

The above-mentioned elements of sync engine 116 and sync client 300 are interconnected as follows. Metadata generator/extractor 301 of sync engine 116 is operatively coupled to metadata importer 311 of sync client 310, as indicated by a dashed line 317. Transaction processor 303 of sync engine 116 is operatively coupled to transaction recorder 313 of sync client 310, as indicated by a dashed line 319. Data extractor 305 of sync engine 116 is operatively coupled to data importer 315 of sync client 310 as indicated by a dashed line 321. Sync client 310 can access local database 308 as indicated by a line 323. These components operate as follows.

In this embodiment, some of the main functions of metadata generator/extractor 301 are to determine whether sync client 310 needs updated metadata, extract metadata that is stored on server 116, and to transfer the extracted metadata to handheld device 300. The metadata includes definitions for screens, views, fields, etc., for the handheld application (not shown) used to access local database 308. Metadata generator/extractor 301 extracts the metadata (stored in a particular format in server 116) and forms messages or datagrams containing the metadata for transmission to sync client 310.

Metadata importer 311 of sync client 310 processes the metadata sent by metadata generator/extractor 301 to update the handheld application in handheld device 300. For example, in one embodiment, metadata importer 311 can determine whether handheld device has enough memory to store the metadata before requesting sync engine 116 to download the metadata. After handheld device 300 stores the metadata, metadata importer 311 can then update the handheld application (not shown) with the new application definitions included in the metadata. One embodiment of the operation is described in more detail below in conjunction with FIG. 9.

In this embodiment, transaction recorder 313 in handheld device 300 records information related to transactions to local database 308 made by the user. For example, each time the user changes data in local database 308, transaction recorder 313 assigns a transaction identifier (transaction ID) and records the transaction ID and other pertinent information about the transaction. In another embodiment, the transaction ID can be assigned when a synchronization process is performed. The above-mentioned other pertinent information can include, for example, the field being changed, the previous and new data, record identifiers and names, and specifications of record relationships that can be used by server 116 to find the changed record or create the new record on main database 112 (FIG. 1). Transaction recorder 313 can then upload the transactions to transaction processor 303 of sync engine 116.

Transaction processor 303 receives the transactions from handheld device 300 and performs each transaction to update main database 112 (FIG. 1). A transaction may conflict with another transaction from another user, in which case transaction processor 303 reports an error without performing the transaction. One embodiment of this operation is described in more detail below in conjunction with FIG. 7. In another embodiment, transaction processor 303 modifies one or more portions of the transaction so that the transaction will succeed. Transaction processor 303 can then send a message to handheld device 300 informing the user of the modification that was performed.

In this embodiment, data extractor 305 of sync engine 116 extracts database data that is visible to handheld device 300 from main database 112 (FIG. 1). The term visibility has a well-known meaning remote access of databases (see for example, U.S. Pat. Nos. 6,216,135 and 6,233,617). In addition, in this embodiment, data extractor 305 can avoid extracting data according to the filter settings (described previously in conjunction with arrow 218 of FIG. 2). Data extractor 305 also forms the extracted database data into file to be downloaded to handheld device 300. In one embodiment, sync engine 116 may send the file to handheld device 300 in a series of small messages or datagrams.

Data importer 315 of handheld device 300 receives the file and temporarily stores the file for updating local database 308. As described below, the file may contain the updated database data in a format that is different from that of local database 308. In such a case, a separate component may be used to process the data into the format of local database 308.

Handheld Devices

Figure 4:
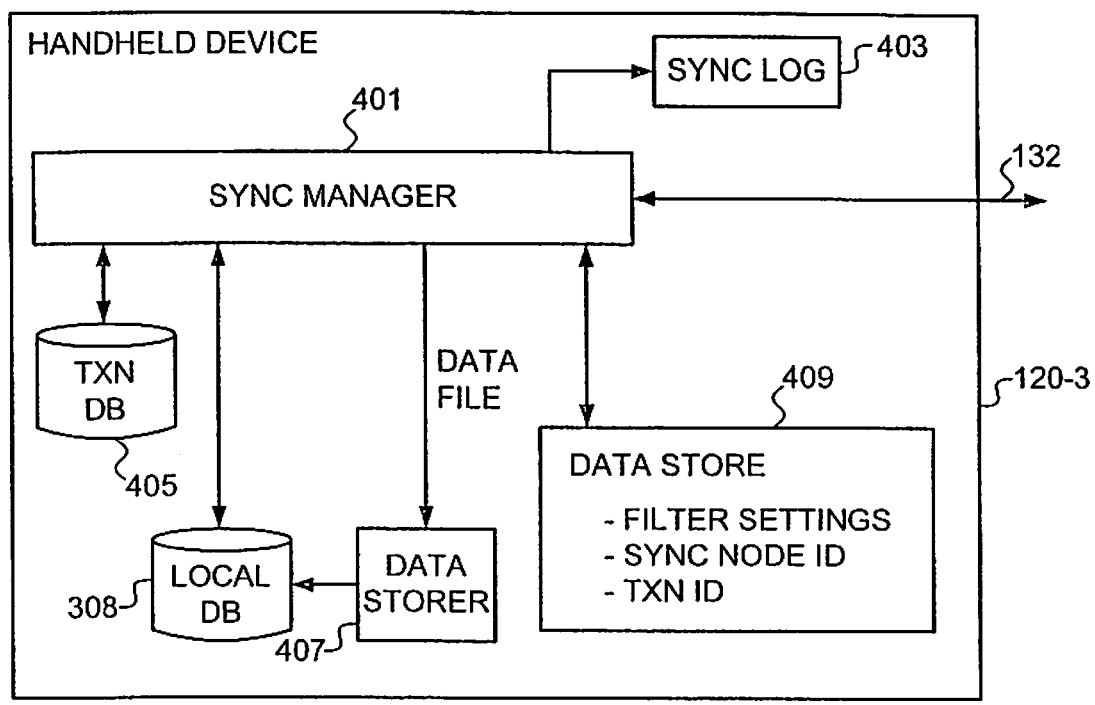
FIG. 4 is a more detailed block diagram illustrating components of a handheld device used in synchronizing the handheld device directly with the server, according to one embodiment of the present invention.

FIG. 4 illustrates handheld device 120-3 (FIG. 1), according to one embodiment of the present invention. In this embodiment, handheld device 120-3 is configured to synchronize directly with server 116. In addition to local database 308, handheld device 120-3 is configured with a sync client 401, a synchronization log (sync log) 403, a transaction database 405, a data storing application (also referred to herein as a data storer) 407 and a datastore 409. In this embodiment, sync client 401 performs the substantially similar functions as described for sync managers 130 and 148 (FIG. 1) that reside in companion devices. In particular, sync client 401 performs the functions of metadata importer 311, transaction recorder 313 and data importer 315 of sync client 310 (FIG. 3).

Sync log 403 is used to hold a list of all messages sent during synchronization operations (e.g., see the operations of FIG. 2), which can then be used to restore information if a problem occurs during synchronization. Transaction database 405 is used to store information related to each transaction (e.g., the information generated by transaction recorder 313 of FIG. 3). In one embodiment, sync manager stores the transaction information in transaction database 405. Alternatively, the handheld application (not shown) stores the transaction information in transaction database 405. Data storer 407 is used in this embodiment to process the downloaded database data to be in the format of local database 308. Datastore 409 is used to store filter settings, the version of local database 308, the version of the handheld application (not shown), a file defining the schema of the local database, and the aforementioned application definitions from the metadata. Datastore 409 is also used to store transaction error messages. In this embodiment, the versions of the local database and the handheld application are referred to herein as the extraction ID and the repository ID, respectively. In some embodiments, datastore 409 can include the operating system's registry (e.g., as in a Windows or Linux operating system).

Sync client 401 is operatively coupled to local database 308, sync log 403, transaction database 405, data storer 407 and datastore 409. Sync client 401 is also operatively coupled to server 116 (FIG. 1) via connection 132. In addition, data storer 407 is operatively coupled to local database 308. The operation of this embodiment of handheld device 120-3 is described below in conjunction with FIG. 6.

Figure 5:
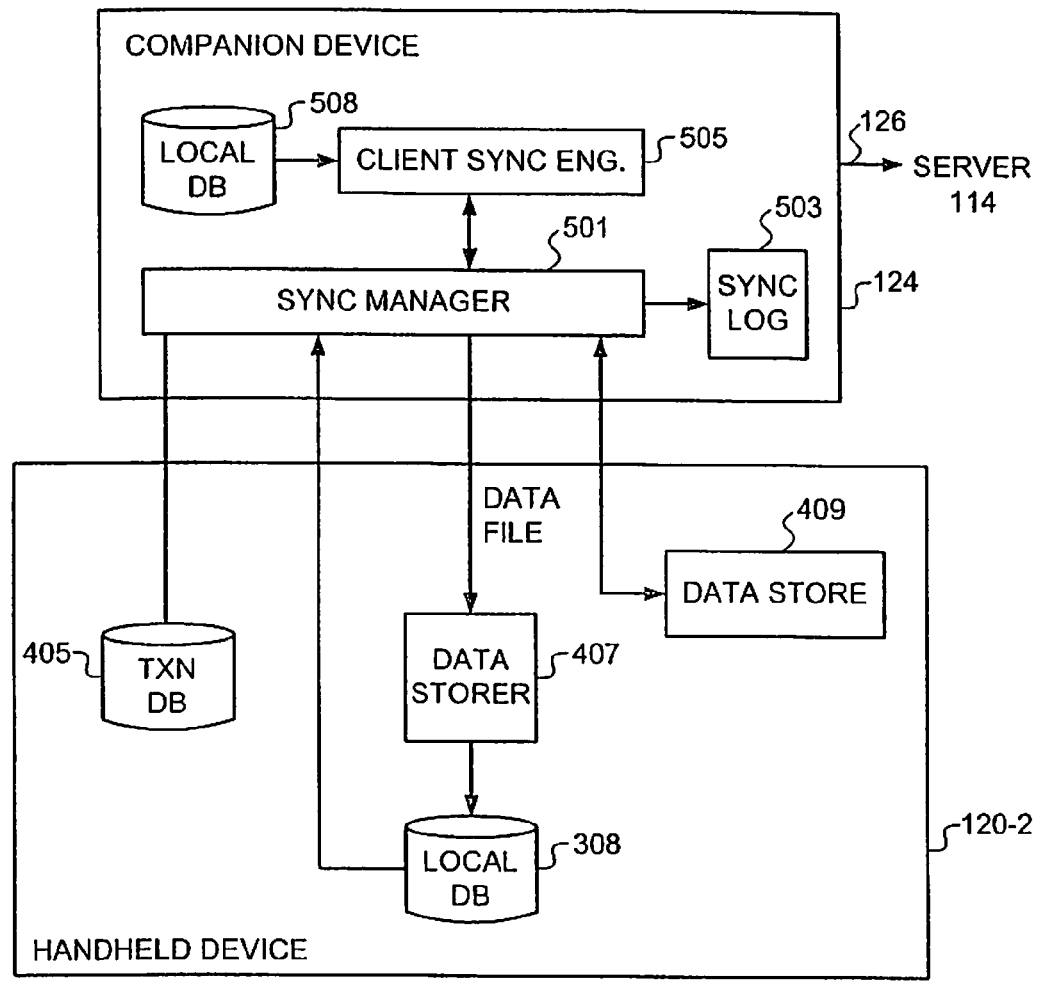
FIG. 5 is a diagram illustrating components of a companion device and a handheld device used in synchronizing the handheld device with the server through the companion device, according to one embodiment of the present invention.

FIG. 5 illustrates components of handheld device 120-2 (FIG. 1) and companion device 124 (FIG. 1), according to one embodiment of the present invention. This embodiment of handheld device 120-2 and companion device 124 together contain components similar to the those described above in handheld device 120-3 (FIG. 4). In particular, handheld device 120-2 is configured with local database 308, transaction database 405, data storer 407 and datastore 409. Companion device 124 is configured with a sync client 501 and a sync log 503, both of which perform functions similar to that of sync client 401 (FIG. 3) and sync log 403 (FIG. 3) of handheld device 120-3. In addition, companion device 124 is configured with a client sync engine 505 and a companion local database 508. Client sync engine 505 provides functions similar to that of sync engine 118 (FIG. 1) in accessing main database 112 (FIG. 1).

In this embodiment, sync client 501 is operatively coupled to local database 308, transaction database 405, data storer 407, and datastore 409 of handheld device 120-2. The interconnection can be implemented through connection 127 (FIG. 1). In addition, sync client 501 is operatively coupled to sync log 503, client sync manager 505 and companion local database 508. In one embodiment, companion local database 508 can store an image of local database 405 of handheld device 120-2. In such an embodiment, companion device 124 can be configured to synchronize companion local database 508 with main database 112 (FIG. 1). A subsequent synchronization of handheld device 120-2 will synchronize its local database 308 with the now synchronized companion local database 508.

Sync Client Processes

Figure 6:
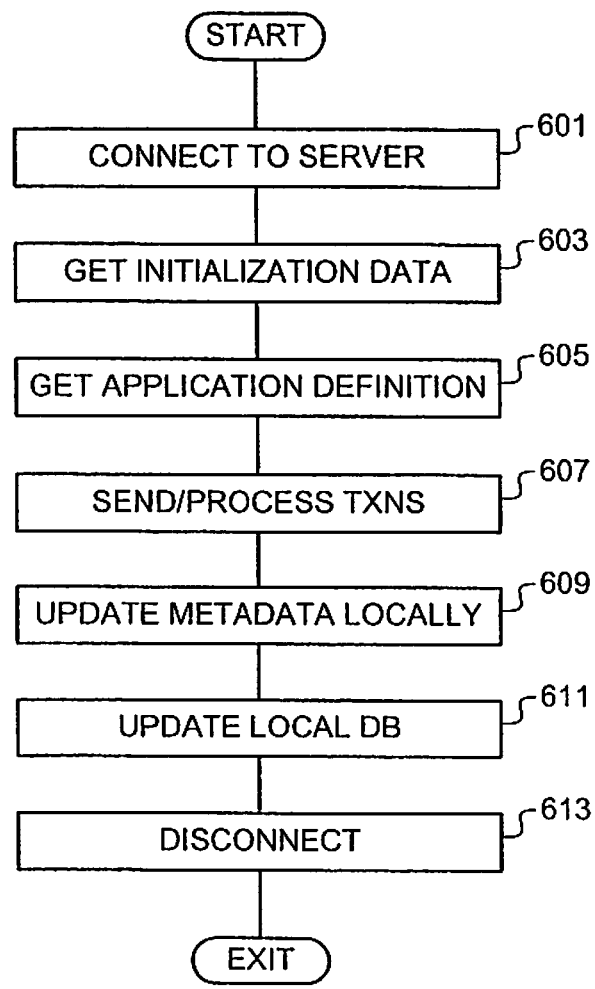
FIG. 6 is a flow diagram illustrating a synchronization process of a client, according to one embodiment of the present invention.

FIG. 6 illustrates the operation of a sync client during a synchronization process, according to one embodiment of the present invention. In this embodiment, the sync client is a handheld device with a direct connection to a server. For example, the handheld device and server can be handheld device 120-3 (FIG. 4) and server 116 (FIG. 1). Alternatively, the sync client can be implemented by the combination of a companion device and handheld device (e.g., companion device 124 and handheld device 120-2 as in FIG. 5). For convenience, the operation of the sync client is described in conjunction with handheld device 120-3 (FIG. 4) and server 116 (FIG. 1). In light of the present disclosure, those skilled in the art will appreciate that the following description can apply to other types of sync clients without undue experimentation.

Referring to FIGS. 4 and 6, one embodiment of a sync client operates as follows. In a block 601, the sync client connects with the server (or companion device in other embodiments). In one embodiment, sync client 401 connects to server 116 when the user performs a login process. In one embodiment, sync client 401 executes an interface or driver that operates a modem to directly access server 116. In other embodiments, this connection may be an Internet connection. In still other embodiments, the connection can be a wireless connection using RF or optical technology to implement a direct, web-based or other type of communication link.

In a block 603, the sync client receives initialization data. In one embodiment, sync client 401 receives initialization data from server 116 via connection 132. As previously described in conjunction with FIG. 2, this initialization data can include information related to the latest version of the main database 112 (e.g., the extraction ID), the latest transaction uploaded to server 116 and the latest version of the handheld application (e.g. the repository ID). In this embodiment, sync client 401 stores the initialization information in datastore 409.

In a block 605, the sync client can receive the application definition version. Block 605 may be omitted if the handheld application definition is included as part of the initialization data received in block 603. In one embodiment, server 116 sends the application definition version (which may have been updated) to sync client 401. Sync client 401 may compare the newly received application definition version with the application version already stored in datastore 409 (i.e., the current version of the handheld application). Sync client 401 then stores the new application definition version in datastore 409.

In a block 607, the sync client can provide transaction information to the server or companion device. In one embodiment, sync client 401 sends the transaction information stored in transaction database 405 to server 116. For example, sync client 401 may send the transaction information for all of the recorded transactions in one block of data. Alternatively, sync client 401 may send the transaction information in several smaller blocks, waiting for an acknowledgement from server 116 before sending the next smaller block. Embodiments of this operation are described in more detail below in conjunction with FIGS. 7 and 8.

In a block 609, the sync client can get metadata from the server. In one embodiment, sync client 401 receives the metadata from server 116. As previously described, this metadata includes application definitions for the handheld application. In this embodiment, sync client 401 performs block 609 if the application definition version received in block 605 does not match the locally stored application definition version (e.g., this situation may occur when the application definitions have been updated). One embodiment of this operation is described in more detail below in conjunction with FIG. 9. In another embodiment, sync client 401 does not compare the application definition versions but rather always requests the metadata from server 116. Server 116 would then determine whether the application definitions need to be updated.

In a block 611, the sync client updates its local database. In one embodiment, sync client 401 requests that server 116 initiates a data extraction operation to provide updated database data to handheld device 120-3. In this embodiment, the user may cause sync client 401 to update filters before getting the database data from server 116. Thus, server 116 will avoid downloading data undesired database data, which helps conserve battery power and reduce the time needed to complete the synchronization process. In one embodiment, server 116 downloads the entire data extract (i.e., the data visible to the sync client and after filtering) in a single large block. In an alternative embodiment, server 116 may download a relatively small block of the data extract in response to a request by sync client 401. If handheld device 120-3 properly receives this block, sync client 401 can send a request for the next block, on so on until handheld device 120-3 receives the entire extract from server 116.

In a further refinement, sync client 401 can first determine whether to receive a full extract or a delta extract. For example, if the version of the database has changed (see block 603), sync client 401 can then request a full extract from server 116. However, if the version of the database has not changed, then sync client 401 can request a delta extract from server 116. For example, in a delta extract, server 116 would compare the full extract of the previous download to handheld device 120-3 to the current fill extract. Server 116 would then only download records from the current full extract that are different from the corresponding records in the previous extract.

In a block 613, the sync client disconnects from the server (or companion device). In this embodiment, in response to input from the user, sync client 401 performs a log out process to disconnect from server 116.

Figure 7:
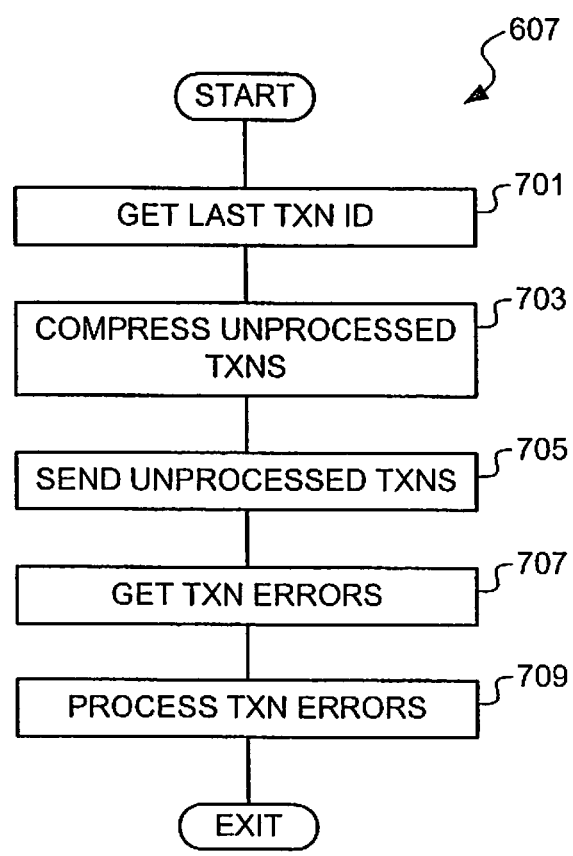
FIG. 7 is a flow diagram illustrating a transaction processing operation, according to one embodiment of the present invention.

FIG. 7 illustrates one embodiment of block 607 (FIG. 6) in more detail, in accordance with the present invention. A sync client performs the operations of FIG. 7. In this embodiment, the sync client resides in handheld device 120-3 that has a direct connection with server 116. As in the description of FIG. 6, the transaction processing operation of block 607 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 7, block 607 is performed as follows in this exemplary embodiment.

In a block 701, the sync client receives information related to the last transaction uploaded to the server or (companion device). In one embodiment, sync client 401 gets a transaction identifier (transaction ID) from server 116. This transaction ID is the identifier of the last transaction received by server 116. In one embodiment, handheld device 120-3 generates a transaction ID using a pseudo-unique ID generator when initialized. In another embodiment, ID generation is guaranteed to be unique. Sync client 401 then increments this pseudo-unique ID each time handheld device 120-3 uploads information recorded for a transaction (also referred to herein as "uploading a transaction") to server 116. In this embodiment, sync client 401 can then compare the received transaction ID with the transaction information in transaction database 405 to send the unprocessed transaction information (i.e., transactions having a transaction ID greater than the transaction ID received from server 116).

In a block 703, the sync client may compress the unprocessed transactions to be uploaded. In one embodiment, sync client 401 compresses the transaction information using any suitable compression algorithm. Sync client 401 may then also convert the compressed information into the format supported by the connection between handheld device 120-3 and server 116 (e.g., text for use in a HTTP connection). In alternative embodiments, block 703 may be omitted (ie., the information need not be compressed).

In a block 705, the sync client then uploads the information of unprocessed transactions. In one embodiment, sync client 401 sends the transaction information to server 116 in a single large block. Alternatively, sync client 401 can send the transaction information in a series of smaller blocks. In one such embodiment, server 116 provides an acknowledgement after properly receiving each smaller block from handheld device 120-3. One embodiment of this operation is described in more detail below in conjunction with FIG. 8.

In a block 707, the sync client gets information regarding errors (if any) that occurred during block 705. In one embodiment, server 116 keeps a record of all of the errors that occurred in processing the transactions. For example, an error may be that a transaction has attempted to update a field that was more recently updated by another user who synchronized before the user of handheld device 120-3. Other examples include errors that occur when the transaction violates other data validation rules that may be imposed by the server that are not imposed by the handheld application.

In a block 709, the sync client then processes the transaction errors. In one embodiment, sync client 401 prompts the user to manually correct the error. In another embodiment, errors are available on a separate error screen that the user can choose to view to manually correct or ignore.

Figure 8:
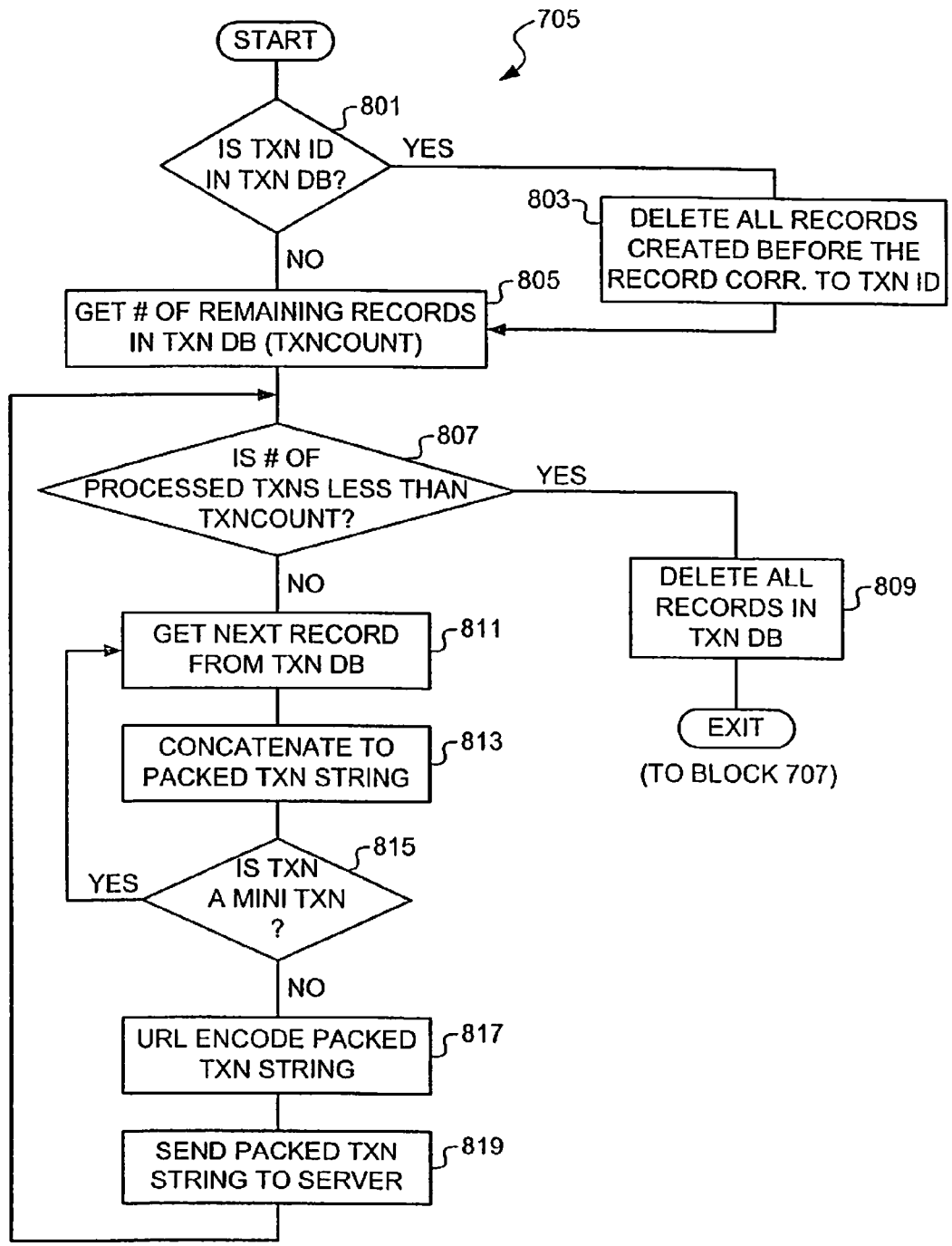
FIG. 8 is a flow diagram illustrating a send transaction operation, according to one embodiment of the present invention.

FIG. 8 illustrates block 705 (FIG. 7) in more detail, according to one embodiment of the present invention. A sync client performs the operations of FIG. 8. In this embodiment, the sync client resides in handheld device 120-3 having a direct connection with server 116. As in the description of FIG. 6, the transaction processing operation of block 705 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 8, block 705 is performed as follows in this exemplary embodiment.

In a block 801, sync client 401 determines whether the transaction ID received in block 701 (FIG. 7) is stored in transaction database 405 (FIG. 4). If the received transaction ID is in transaction database 405, then all of the transaction records in transaction database 405 created before the transaction corresponding to the received transaction ID have already been received by server 116 and thus are no longer needed. In one embodiment, sync client 401 performs a block 803 in which it deletes all of the transaction records in transaction database 405 having a transaction ID that is smaller than (i.e., created before) the received transaction ID.

However, if in block 801 sync client 401 determines that the received transaction ID is not in transaction database 405, then none of the transaction records remaining in transaction database 405 have been properly received by server 116. In a block 805, sync client 401 determines the number of unprocessed transaction records stored in transaction database 405. In one embodiment, this number is stored in a variable (referred to herein as TXNCOUNT for convenience). Block 805 is also performed following the completion of block 803.

In a block 807, sync client 401 determines whether the number of processed transaction records is less than the value of TXNCOUNT. That is, following block 805, the number of processed transaction records in the current performance of block 705 is set to zero. As each transaction record in transaction database 405 is processed (e.g., uploaded to server 116), the number of processed transaction records is incremented. When the number of processed transaction records reaches the value of TXNCOUNT, then all of the transaction records in transaction database 405 have been processed. In this case, the process proceeds to a block 809 in which all of the transaction records stored in transaction database 405 are deleted and block 705 ends.

However, if the number of processed transaction records is less than the value of TXNCOUNT, the process proceeds to a block 811 in which sync client 401 gets the next transaction record from transaction database 405.

In a block 813, sync client 401 adds the transaction record to a transaction string or message that is to be uploaded to server 116. In one embodiment, sync client 401 packs the transaction record in a transaction string that is to be uploaded to server 116. In some other embodiments, a transaction record may be stored in transaction database 405 as a series of small mini-transaction records (especially if the transaction is a complex or large transaction). In block 813, sync client 401 would concatenate a mini-transaction record with the existing transaction string.

In a block 815, sync client 401 determines if the transaction record is a mini-transaction record. For example, in one embodiment, each mini-transaction record of a transaction would have the same transaction ID. Sync client 401 can determine whether a transaction record is a mini-transaction record by comparing the transaction ID of the current transaction record with the transaction ID of the previous transaction record. If the transaction record is a mini-transaction record, then the operational flow loops back to block 811. However, if the transaction record is not a mini-transaction, then a block 817 is performed.

In block 817, in this embodiment, the transaction string (from block 813) is URL (Uniform Resource Locator) encoded so that the string can be sent to server 116 via an HTTP connection. In one embodiment, sync client 401 URL encodes the transaction string.

In a block 819, the URL encoded transaction string is uploaded. In one embodiment, sync client 401 places the encoded transaction string in the header of an HTTP request and sent to server 116. If the transaction string is too large (e.g., greater than two kilobytes), the string is uploaded using more than one HTTP request. After the transaction string is uploaded, the process returns to block 807. The process repeats until all of the transaction records in transaction database 405 have been processed.

Figure 9:
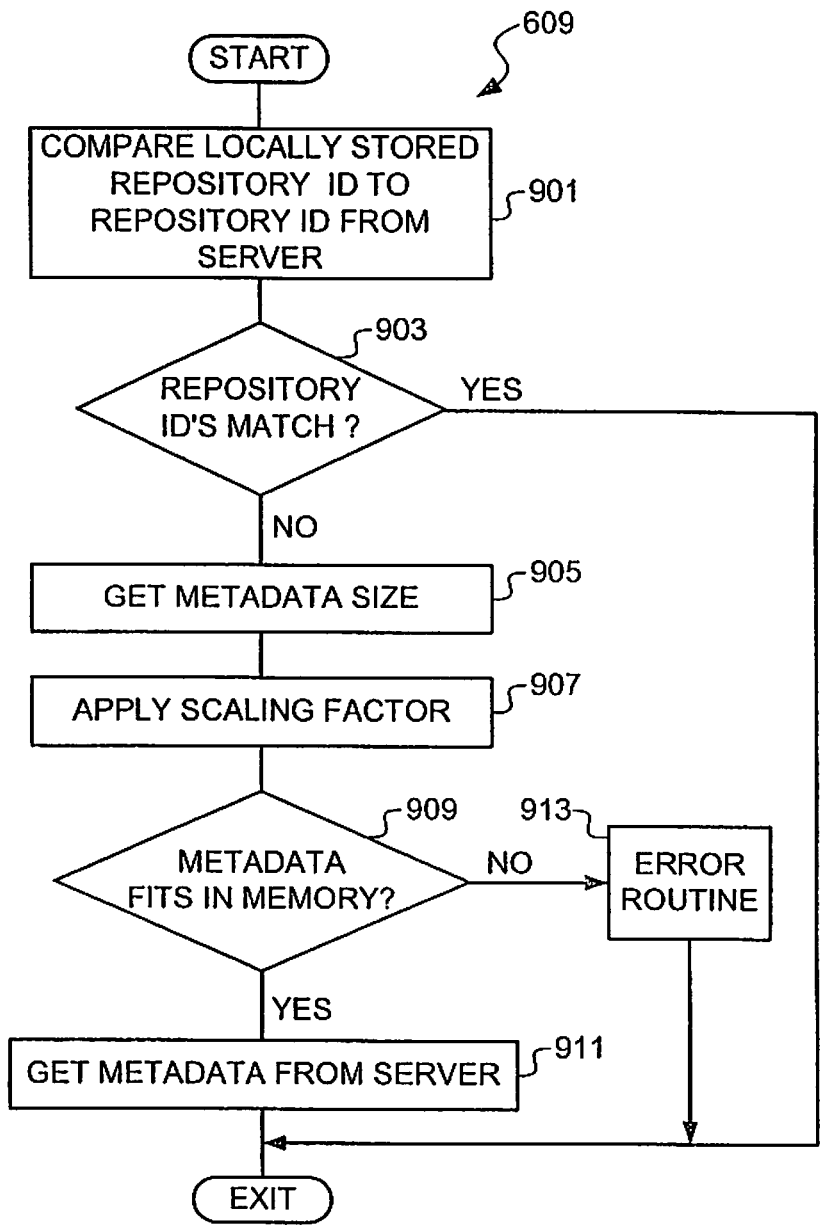
FIG. 9 is a flow diagram illustrating a metadata update operation, according to one embodiment of the present invention.

FIG. 9 illustrates block 609 (FIG. 6) for updating metadata, according to one embodiment of the present invention. A sync client performs the operations of FIG. 9. In this embodiment, the sync client resides in handheld device 120-3 (FIG. 4) having a direct connection with server 116 (FIG. 1). As in the description of FIG. 6, the transaction processing operation of block 609 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 9, block 609 is performed as follows in this exemplary embodiment.

In a block 901, sync client 401 compares the locally stored repository ID (i.e., stored in datastore 409) with the repository ID from server 116 (see block 605 of FIG. 6). The locally-stored repository ID indicates the version of the handheld application residing in handheld device 120-3, whereas the repository ID from server 116 indicates the version of the handheld application that handheld device 120-3 should have (e.g., the handheld application may have been updated since the last time handheld device 120-3 was synchronized).

In a block 903, sync client 401 determines whether the repository IDs match. If they match, then handheld device 120-3 has the correct version of the handheld application and block 609 terminates. However, if they do not match, handheld device 120-3 must be updated with the correct version of the handheld application. Thus, if in block 903 the repository IDs do not match, the process proceeds to a block 905.

In block 905, sync client 401 gets the size of the metadata. In one embodiment, sync client 401 gets the size of the metadata from server 116. However, this size does not represent the size the metadata will occupy in handheld device 120-3 when downloaded and stored in the datastore.

In a block 907, sync client 401 applies a scaling factor to the size received in block 905 to determine a maximum expected size of the executed metadata. In one embodiment, this scaling factor is determined experimentally. In other embodiments, the scaling factor may be configurable or dynamically determined. The scaling factor ensures that the actual size of the executed metadata is less than or equal to the maximum expected size.

In a block 909, sync client 401 determines whether the memory available in handheld device 120-3 is sufficient to store the metadata. In one embodiment, sync client 401 compares the maximum expected size determined in block 907 with the available memory.

If there is sufficient available memory, sync client 401 gets the metadata from server 116 in a block 911. In one embodiment, sync client 401 pulls the metadata from server 116 in a single transfer. In another embodiment, sync client 401 pulls the metadata from server 116 in a series of smaller transfers.

If in block 909 there is not sufficient available memory, the process proceeds to a block 913. In block 913, sync client 401 performs an error routine to gracefully exit block 609. For example, sync client 401 can cause handheld device 120-3 to display a message to the user that there is insufficient memory available to complete the synchronize process and suggesting that the user delete unneeded files and retry the synchronization process. In another embodiment, the error routine of block 913 can prompt the user to free memory space and once the user does so, return to block 909 instead of exiting.

Figure 10:
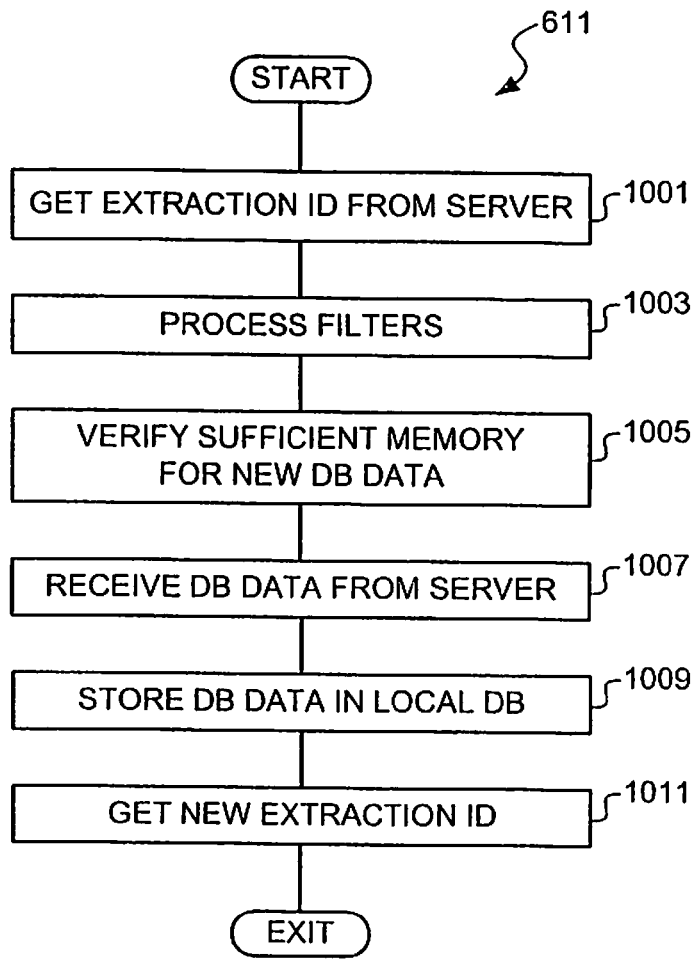
FIG. 10 is a flow diagram illustrating a data extraction operation, according to one embodiment of the present invention.

FIG. 10 illustrates block 611 (FIG. 6) for extracting database data, according to one embodiment of the present invention. A sync client performs the operations of FIG. 10. In this embodiment, the sync client resides in handheld device 120-3 (FIG. 4) having a direct connection with server 116 (FIG. 1). As in the description of FIG. 6, the transaction processing operation of block 611 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 10, block 611 is performed as follows in this exemplary embodiment.

In a block 1001, sync client 401 gets the extraction ID from server 116. In one embodiment, sync client 401 gets this information in block 603 (FIG. 6) as part of the initialization information. This extraction ID indicates the version of the database that handheld device 120-3 should have. In addition, handheld device 120-3 also locally stores the extraction ID (e.g., in datastore 409) that indicates the version of the database currently residing in handheld device 120-3. These extraction IDs can be different if the database architecture was updated since the last time handheld device 120-3 was synchronized. For example, main database 112 (FIG. 1) may have been updated to add and/or delete fields or tables.

In a block 1003, sync client 401 processes the filters. In one embodiment, the user may have modified the filter settings on handheld device 120-3. As previously described, the filter settings are used by the server to download only the database data desired by the user. One advantage of this filtering is that it reduces the amount of downloaded data to a size that can fit in the memory of handheld device 120-3. Sync client 401 can download the filter settings stored in server 116 and use them to update the locally updated filter settings. Sync client 401 can also upload the user modified filter settings to server 116. The server will ensure that the user modified filter settings are valid settings. The valid new filter settings are used by the server in downloading database data to handheld device 120-3. The filter settings are described below in more detail in conjunction with FIG. 10A.

In a block 1005, sync client 401 determines whether handheld device 120-3 has sufficient memory available to store the database data to be downloaded by server 116. In one embodiment, sync manager 116 gets the size of the data extract from server 116. As previously mentioned, server 116 accesses main database 112 (FIG. 1) to create an extract of database data that is visible to handheld device 120-3 and has been filtered according to the valid filter settings uploaded from the handheld device. Server 116 provides the size of the data extract (either a full extract or a delta extract) to sync client 401, which can then determine whether there is sufficient memory available in handheld device 120-3.

If there is sufficient memory, sync client 401, in a block 1007, pulls the data extract (either full or delta) from server 116. Sync manager 410 can pull the data extract in a single transfer or in a series of smaller transfers. In a block 1009, sync client 401 stores the extract in local database 308.

However, if handheld device 120-3 does not have sufficient memory available to store the extract, block 611 terminates.

For example, sync client 401 can execute an error routine similar to block 913 (FIG. 9) to gracefully exit from block 611.

In a block 1011, sync client 401 gets a new extraction ID from server 116. Sync client 401 may omit block 1011 if the locally stored extraction ID is the same as the extraction ID received from server 116 in block 1001.

Figure 10A:
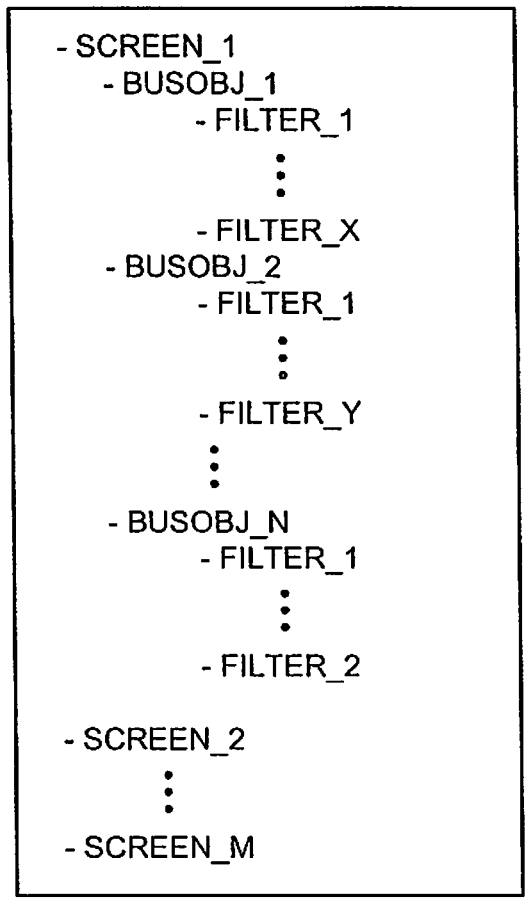
FIG. 10A is a diagram illustrating filters, according to one embodiment of the present invention.

FIG. 10A illustrates the filters described in block 1003 (FIG. 10), according to one embodiment of the present invention. In this embodiment, filters are associated with screens defined by the metadata (described above in conjunction with FIGS. 3 and 9). As previously described, the screens are displayed by the handheld application executed in the handheld device to provide a user interface to the handheld device's local database. For example, the screens can display selected groups of database data in formats/arrangements that allow users to more easily use and understand the data.

As shown in FIG. 10A, the filters have multiple screens, indicated as SCREEN_1 to SCREEN_M. When the handheld application is running, the user can navigate through the various screens to cause the handheld device to display desired database data. Each screen has at least one business object. For example, screen SCREEN_1 has several business objects indicated as BUSOBJ_1 to BUSOBJ_N. The business objects are predetermined to define groups of related data to be displayed by the handheld device. The screens are defined to have only one business object per screen to simplify the processing in block 1003 (FIG. 10).

Figure 11:
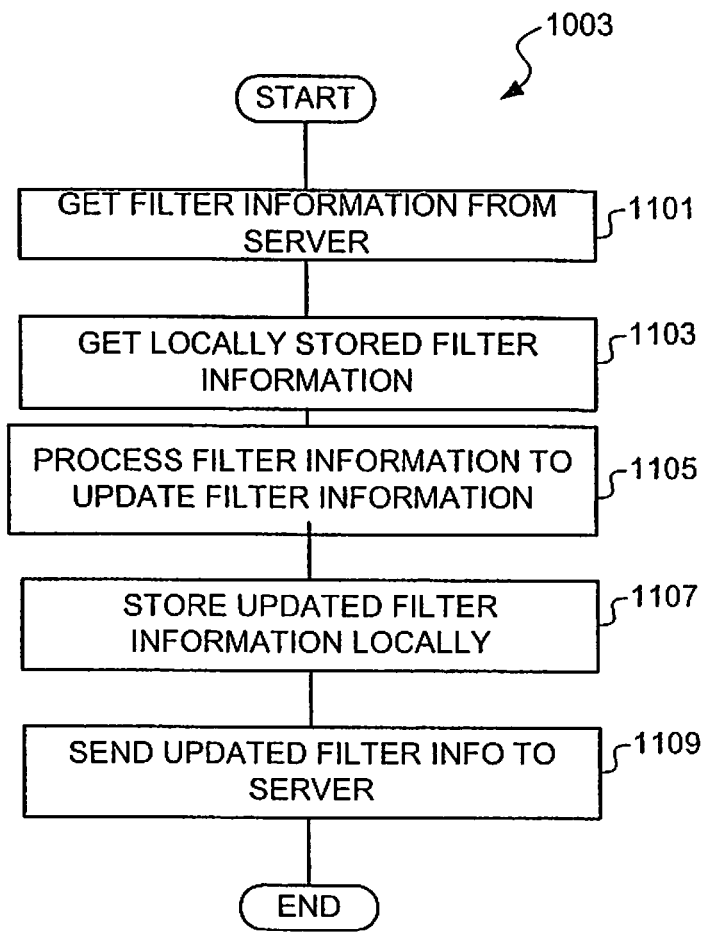
FIG. 11 is a flow diagram illustrating a filter processing operation, according to one embodiment of the present invention.

FIG. 11 illustrates block 1003 (FIG. 10) for processing filters, according to one embodiment of the present invention. In this embodiment, a sync client performs the operations of block 1003. In this embodiment, the sync client resides in handheld device 120-3 (FIG. 4) having a direct connection with server 116 (FIG. 1). As in the description of FIG. 10, the operation of block 1003 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 11, block 1003 is performed as follows in this exemplary embodiment.

In a block 1101, sync client 401 downloads filter information from server 116 (FIG. 1). This filter information includes the filter settings that server 116 used in previous synchronization operation for sync client 401. In addition, this filter information can includes updates to the filters provided by a system administrator or by the vendor of sync client 401 or sync engine 118 (FIG. 1). This filter information can include: (a) screen identifiers; (b) the identifiers of the business object(s) associated with each screen; and (c) each business object's associated filter(s). Because the screens each have only one associated business object, the filter information can downloaded as a file containing only the screens and their associated filters. In this embodiment, the downloaded file is temporarily stored in handheld device 120-3 (FIG. 1) for access by sync client 401.

In a block 1103, sync client 401 gets a file of locally stored filter settings (also referred to herein as the filter settings file). This filter settings file can contain filter settings revised by the user after the previous synchronization operation. Sync client 401 can then access the filter settings file during block 1103.

In a block 1105, sync client 401 updates the filter information to include information from both the filter settings file and the filter information downloaded in block 1101. In addition, sync client 401 can also update the filter information with a default filter setting(s) for a business object(s). In one embodiment, sync client 401 includes a component (e.g. a dialog) that allows the user to select filter settings. For example, this component can display a screen along with a menu that allows the user to make filter setting selections. The next screen is then displayed so that the user can change the settings as desired. This is repeated until all of the screens have been displayed. The filter settings file is updated to reflect the filter setting selections.

In a block 1107, sync client 401 updates the filter settings file to include the updated filter information. This updated filter settings file is saved locally in handheld device 120-3

In a block 1109, sync client 401 provides the updated filter information to server 116. In one embodiment, sync client 401 uploads the updated filter information to server 116 in the form of an XML string, which is then URL encoded before sync client 401 sends the filter setting information to server 116. In other embodiments, the filter information is in the form of a packed string with preselected characters used to link a business object with a filter setting(s) and to indicate a next business object.

Figure 12:
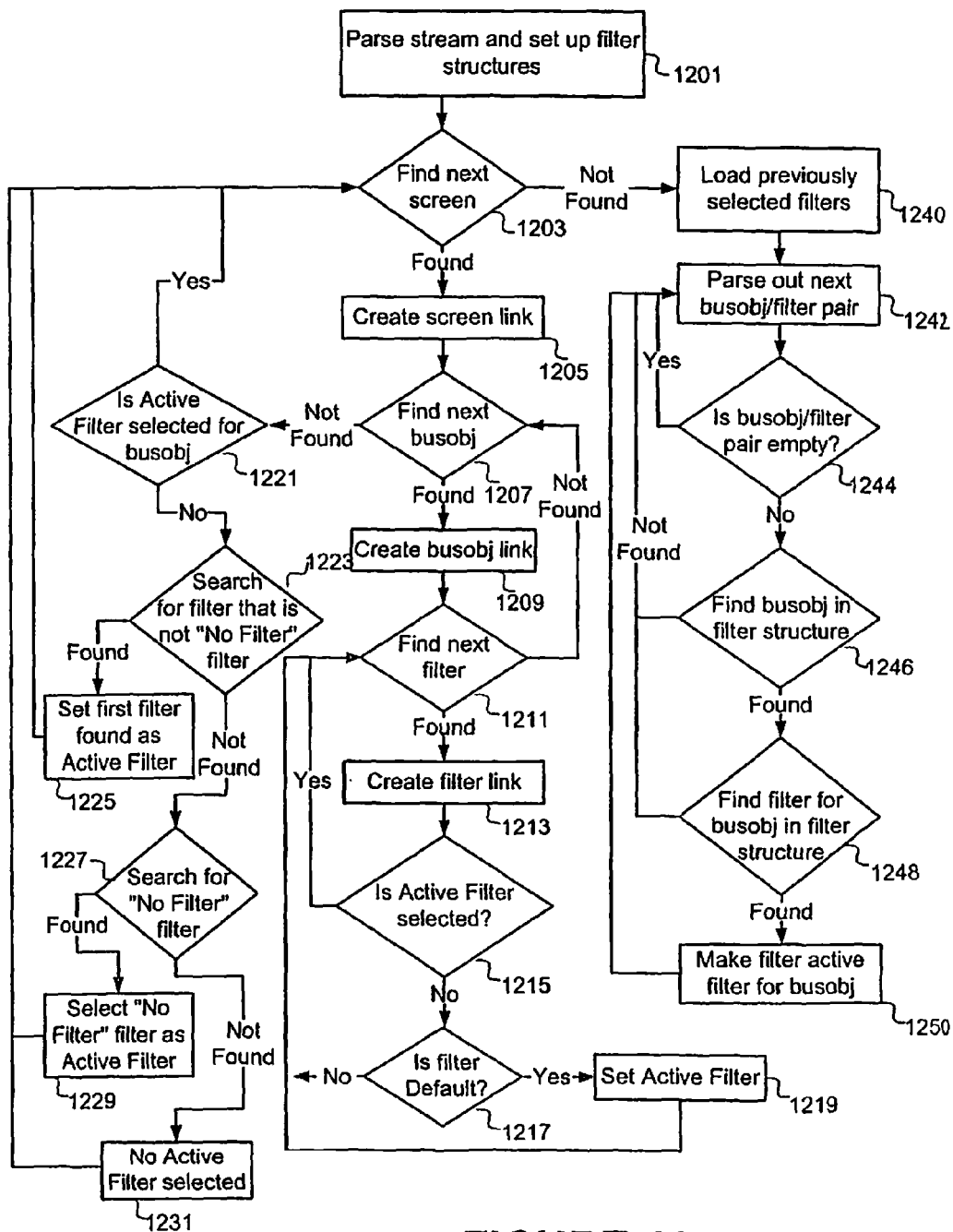
FIG. 12 is a flow diagram illustrating in more detail a filter processing operation, according to one embodiment of the present invention.

FIG. 12 illustrates in more detail blocks 1103, 1105, and 1107 (FIG. 11), according to one embodiment of the present invention. In this embodiment, a sync client performs the operations. In one embodiment, the sync client resides in handheld device 120-3 (FIG. 4) having a direct connection with server 116 (FIG. 1). As in the description of FIG. 11, the operations of blocks 11 03, 1105 and 1107 are described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 11, blocks 1103, 1105 and 1107 are performed as follows in this exemplary embodiment.

In a block 1201, sync client 401 parses the downloaded filter information (see block 1101 of FIG. 11). In one embodiment, the downloaded filter information is in the form of an XML encoded stream. Sync client 401 sets up a data structure for storing filter information parsed from the downloaded information. In one embodiment, the data structure is a linked list. In another embodiment, the data structure can be a mark-up language file such as, for example, XML, SGML or HTML.

In a block 1203, sync client 401 searches for a next screen in the parsed downloaded filter information. If sync client 401 finds a screen, then, in a block 1205, sync client 401 places the screen in the data structure. For example, in the linked list embodiment, sync client 401 can create a link for the found screen. In an XML embodiment, sync client 401 can create tags or attributes for the screen.

In a block 1207, sync client 401 searches for a next business object associated with the screen of block 1203. If sync client 401 finds a business object, then, in a block 1209, sync client 401 places the business object in the data structure, with a mechanism to indicate the relationship between the business object and the screen. Continuing the linked list example above, sync client 401 can create a link from the screen found in block 1203 to the business object found in block 1207. In an XML embodiment, sync client 401 can create tags or attributes for the business object.

In block 1211, sync client 401 searches for a next filter associated with the business object of block 1207. If sync client 401 finds a filter, then in a block 1213, sync client 401 places the filter in the data structure. Continuing the linked list example above, sync client 401 can create a link from the business object found in block 1207 to the filter found in block 1211. In an XML embodiment, sync client 401 can create tags or attributes for the filter. As previously described in conjunction with FIG. 10A, a business object may have more than one filter. However, in this embodiment, only one filter can be active at a time.

In a block 1215, sync client 401 determines whether the active filter for the business object found in block 1207 has been selected. In one embodiment, the data structure includes a separate "active filter" pointer to point at the active filter corresponding to the business object found in block 1207. Sync client 401 can check whether this pointer is filled (i.e., points to an address). If the pointer is empty, the active filter for the business object has not been selected.

If the active filter has been selected, the operational flow returns to block 1211 to search for a next filter. However, if the active filter has not been selected, sync client 401, in a block 1217, determines whether the filter found in block 1207 is a default filter. If so, then in a block 1219, sync client 401 sets the filter as the default filter. For example, sync client 401 loads the "active filter" pointer with the address of the default filter and the operational flow returns to block 1211. If in block 1217 the filter is not a default filter, the operational flow returns to block 1211 to find the next filter.

Returning to block 1207, if sync client 401 does not find a next business object, the operational flow proceeds to a block 1221. For example, sync client 401 may not find a next business object when all of the business objects for a screen have been found, or when sync client 401 cannot find a default filter for the current business object (i.e., found in the previous performance of block 1207). In block 1221, sync client 401 determines whether an active filter has been selected for current business object. If sync client 401 determines that an active filter has been selected (e.g., when all of the filters for the current business object have been found and one is a default filter), the operational flow returns to block 1203 to find a next screen. However, if sync client 401 determines that no active filter has been selected (e.g., when no filter has been found for the current business object, or none of the found filters is a default filter), the operational flow proceeds to a block 1223.

In block 1223, sync client 401 searches the found filter(s) for the current business object (i.e., through one or more iterations of blocks 1211-1219) for a filter that is not a "No Filter" filter. More particularly, as previously described, a business object need not have an active filter. For this case, this embodiment uses a "No Filter" filter to indicate that the business object does not have an active filter. If in block 1223 sync client 401 finds a filter in the found filter(s) that is not a "No Filter" filter, then in a block 1225 sync client 401 selects this filter as the active filter.

However, if in block 1223 no such filter is found, the operational flow proceeds to a block 1227. In one embodiment of block 1227, sync client 401 searches the found filter(s) for a "No Filter" filter. If sync client 401 finds a "No filter" filter, then in a block 1229, sync client 401 selects this filter as the active filter. However, if in block 1227 sync client 401 does not find a "No Filter" filter, then no active filter is selected as indicated by a block 1231. Following either of blocks 1229 and 1231, the operational flow returns to block 1203 to find a next screen.

If in block 1203 sync client 401 does not find a screen (e.g., all of the screens have been found in previous iterations of block 1203), the operational flow proceeds to a block 1240. In this embodiment of block 1240, sync client 401 gets the filter settings file (see block 1103 described above). As previously mentioned, the filter settings file can contain filter settings revised by the user after the previous synchronization operation. In this embodiment, the filter settings include each business object and its associated activated filter (i.e., a business object/filter pair).

In a block 1242, sync client 401 parses out the next business object/filter pair from the filter settings file. Sync client 401 loops back to block 1242 (as described below) until all of the business object/filter pairs have been parsed out of the filter settings file.

In a block 1244, sync client 401 determines whether the business object/filter pair is empty (i.e., no active filter was selected in the previous synchronization operation). If the business object/filter pair is empty, the operation flow returns to block 1242 to parse out the next business object/filter pair.

However, if in block 1244, sync client 401 determines that the business object/filter pair is not empty, the operational flow proceeds to a block 1246. In block 1246, sync client 401 then searches the data structure (see blocks 1205-1213) for the business object indicated by the business object/filter pair. Block 1246 is useful because the business object may no longer exist, for example, in an update of the handheld application. If in block 1246 sync client 401 does not find the business object in the data structure, the operational flow returns to block 1242 to parse out the next business object/filter pair.

However, if sync client 401 does find the business object in block 1246, the operational flow proceeds to a block 1248. In block 1248, sync client 401 searches the aforementioned data structure for the filter. As described above for the business object, the filter may no longer exist due to an update in the handheld application. If in block 1248 sync client 401 does not find the filter in the data structure, the operational flow returns to block 1242 to parse out the next business object/filter pair. However, if sync client 401 does find the filter in data structure, sync client 401 then sets this found filter as the active filter in a block 1250. The operational flow then returns to block 1242 to parse out the next business object/filter pair.

The operational flow of the embodiment of FIG. 12, in effect, retrieves the latest filter settings stored in the server for the sync client and then resets the filter settings to the default active filters. Then the locally stored user settings from the previous synchronization operation are used to update the default active filters for those business object and filters. This embodiment helps ensure that filter settings are correct when the handheld application is updated.

Figure 13:
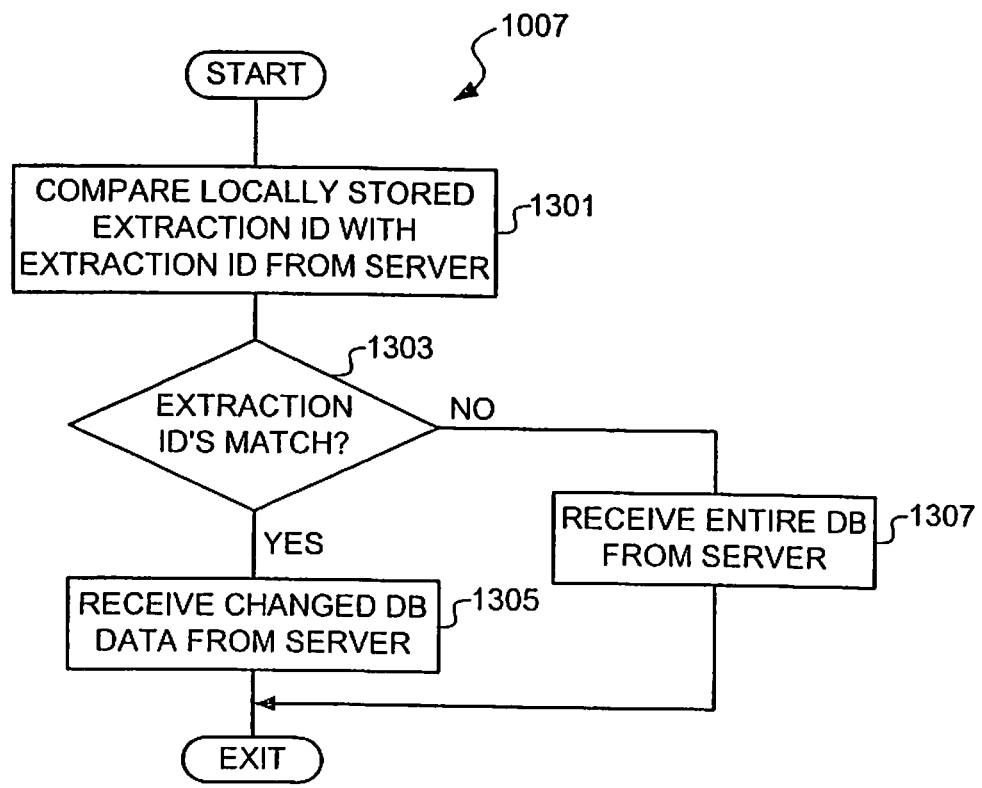
FIG. 13 is a flow diagram illustrating a data extract operation, according to one embodiment of the present invention.

FIG. 13 illustrates block 1007 (FIG. 10) for extracting data, according to one embodiment of the present invention. In this embodiment, a sync client performs the operations of block 1007. As in the description of FIG. 10, the operation of block 1007 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 13, block 1007 is performed as follows in this exemplary embodiment.

In a block 1301, sync client 401 gets the locally stored extraction ID with the extraction ID downloaded from server 116 for comparison. As previously described, the extraction ID identifies the version of the database extract. For example, if the database structure on server 116 has changed, the extraction IDs will be different.

In a block 1303, sync client 401 determines whether the locally stored and downloaded extraction IDs match. If the extraction IDs match, the operational flow proceeds to a block 1305. In block 1305, sync client 401 requests a delta extract from server 116. As previously described, a delta extract includes only the database data that has changed since the previous synchronization operation. For example, in one embodiment, for each sync client, the sync engine (e.g., sync engine 118 or 128 in FIG. 1) keeps a copy of the extract after each synchronization operation. Then during a current synchronization operation, the sync engine (e.g., sync engine 118 or 128) retrieves a full extract for the sync client from main database 112 (FIG. 1). For a delta extract, sync client 401 would compare the stored extract with the fill extract retrieved from main database 112 and transmit only the changed database data to the sync engine (118 or 128). This delta extract is then received by sync client 401.

In contrast, if sync client 401 determines in block 1303 that extraction IDs do not match, the operation flow proceeds to a block 1307. In block 1307, sync client 401 requests a full extract from server 116. Server 116 then provides the full extract, which is then received by sync client 401.

Figure 14:
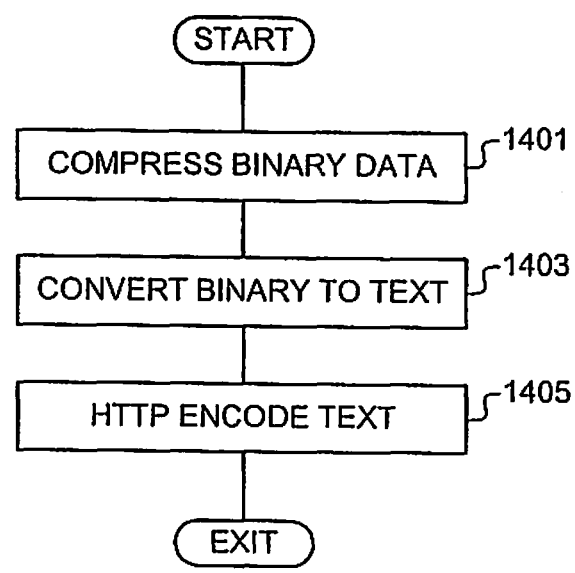
FIG. 14 is a flow diagram illustrating a compression operation, according to one embodiment of the present invention.

FIG. 14 illustrates a compression operation, according to one embodiment of the present invention. This compression operation can be performed by a sync client (e.g., sync client 401 of FIG. 4) or a server (e.g., server 114 or 116 of FIG. 1). For example, this compression operation can be performed by server 116 before sending database data (e.g., a delta extract) to sync client 401. This compression algorithm can also be used by sync client 401 to send information back to server 116. For example, this compression operation can be used to implement block 703 (FIG. 7). This compression operation advantageously reduces the time needed to transfer information between a server and a sync client.

In a block 1401, information to be transmitted is compressed. In one embodiment, the information is binary data such as database data, transaction data or metadata. Any suitable compression algorithm can be used. In one embodiment, the binary information is compressed using the Zip 2.3 compression utility available from www.info-zip.org. In other embodiments, other compression algorithms can be used.

In a block 1403, the compressed binary data is converted to text. In one embodiment, the compressed binary data is converted to text using standard Base-64 encoding. The conversion to text helps reduce corruption of the data during the transmission process. In a further refinement, the text data can include mark-up using a mark-up language such as XML (extensible mark-up language) or HTML (hypertext mark-up language).

In a block 1405, the text data generated in block 1403 is encoded using a protocol for the connection between the server and sync client. In one embodiment, standard hypertext transfer protocol (HTTP) is used to encode the text data for transmission over the Internet. In other embodiments, different protocols can be used, depending on the nature of the connection between the server and the sync client. For example, in other embodiments, the text data may be file transfer protocol (FTP) encoded. This compressed and encoded information can then be sent to the intended recipient. In some embodiments, block 1403 can be omitted with block 1405 encoding the compressed binary data from block 1401 instead of text.

In a further refinement of this operation, the information to be sent can be broken into smaller units that are then separately compressed and encoded according to blocks 1401, 1403, and 1405. These smaller units are sent separately to the recipient so that, before receiving the next unit of information, the recipient can: (a) store the compressed unit of information; (b) decompress the stored compressed unit of information; (c) store the decompressed unit of information; and (d) delete the compressed unit of information. This refinement reduces the amount of available memory needed by the recipient to properly receive and decompress the transmitted information.

Server Processes

Figure 15:
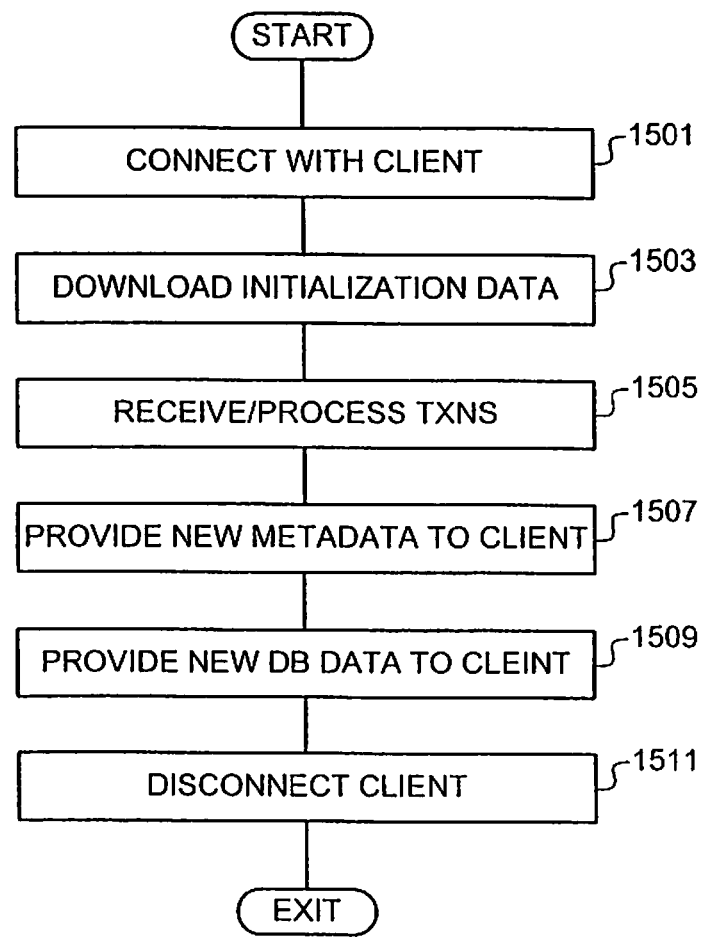
FIG. 15 is a flow diagram illustrating a synchronization process of a server, according to one embodiment of the present invention.

FIG. 15 illustrates a synchronization process of a server, according to one embodiment of the present invention. In this embodiment, the server is connected to a sync client. For example, the sync client can reside in a handheld device that has a direct connection to the server. In one embodiment, the handheld device and server can be handheld device 120-3 (FIG. 4) and server 116 (FIG. 1). Alternatively, the sync client can be implemented by the combination of a companion device and handheld device (e.g., companion device 124 and handheld device 120-2 as in FIG. 5). For convenience, the operation of the server is described in conjunction with server 116 (FIG. 1) and handheld device 120-3 (FIG. 4). In light of the present disclosure, those skilled in the art will appreciate that the following description can apply to other types of servers and sync clients without undue experimentation.

Referring to FIGS. 4 and 15, one embodiment of a server operates in conjunction with a sync client as follows. In a block 1501, the server connects with the sync client. The sync client may reside in a companion device in some embodiments. In this embodiment, server 116 connects to sync client 401 in response to the user logging in. In one embodiment, server 116 executes an interface or driver that operates a modem to directly access sync client 401. In other embodiments, this connection may be an Internet connection. In still other embodiments, the connection can be a wireless connection using RF or optical technology to implement a direct, web-based or other type of communication link.

In a block 1503, the server downloads initialization data to the sync client. In one embodiment, server 116 downloads initialization data to sync client 401 via connection 132. As previously described, this initialization data can include information related to the latest version of the main database 112 (e.g., the extraction ID), the identifier for latest transaction uploaded to server 116 by sync client 401, and the latest version of the handheld application (e.g. the repository ID).

In a block 1505, the server can receive transaction information from the sync client. In one embodiment, server 116 receives the transaction information from sync client 401 and can store this transaction information in a memory (not shown) of computer system 110 (FIG. 1). For example, server 116 may receive the transaction information for all of the recorded transactions from sync client 401 in one relatively large block of data. Alternatively, server 116 may receive the transaction information in several smaller blocks from sync client 401. In this alternative embodiment, server 116 would provide an acknowledgement to sync client 401 after receiving each smaller block, which then signals sync client 401 to send the next smaller block.

In a block 1507, the server can send metadata from the sync client. In one embodiment, server 116 sends the metadata to sync client 401. As previously described, this metadata includes application definitions for the handheld application. In this embodiment, server 116 performs block 1507 in response to a request from sync client 401. As previously described, sync client 401 can request the metadata if the application stored in server 116 (from the most recent synchronization operation) does not match the locally stored application definition version. This situation may occur when the application definitions have been updated after the previous synchronization operation. In another embodiment, sync client 401 is configured to always request the metadata during a synchronization operation without comparing versions. In this alternative embodiment, server 116 would determine whether the application definitions have been updated since the last synchronization operation and if so, send the metadata to sync client 401. In a further refinement of this alternative embodiment, server 116 can automatically perform these operations without waiting for a request from sync client 401, pushing the metadata to sync client 401 if the applications definitions have been updated.

In a block 1509, the server updates the sync client's local database. In one embodiment, server 116 receives a request from sync client 401 to initiate a data extraction operation. In this embodiment, server 116 may receive updated filter settings (see the descriptions of FIGS. 11 and 12 above) before performing the data extraction operation. Thus, server 116 will avoid downloading data undesired database data, which helps conserve battery power and reduce the time needed to complete the synchronization process. In one embodiment, server 116 downloads the entire data extract (i.e., the data visible to the sync client and after filtering) in a single large block. In an alternative embodiment, server 116 may download a relatively small block of the data extract in response to a request by sync client 401. If sync client 401 properly receives this relatively small block, sync client 401 can send a request for the next relatively small block, on so on until sync client 401 receives the entire data extract from server 116. This data extract can be a full or delta extract (described in more detail below in conjunction with FIG. 16).

In a block 1511, the server disconnects from the sync client. In this embodiment, server 116 disconnects from sync client 401 in response to a log out process initiated by the user (or performed automatically by sync client 401 upon completion of the synchronization operation). In an alternative embodiment, server 116 can automatically disconnect from sync client 401 after performing the operations of block 1509.

Figure 16:
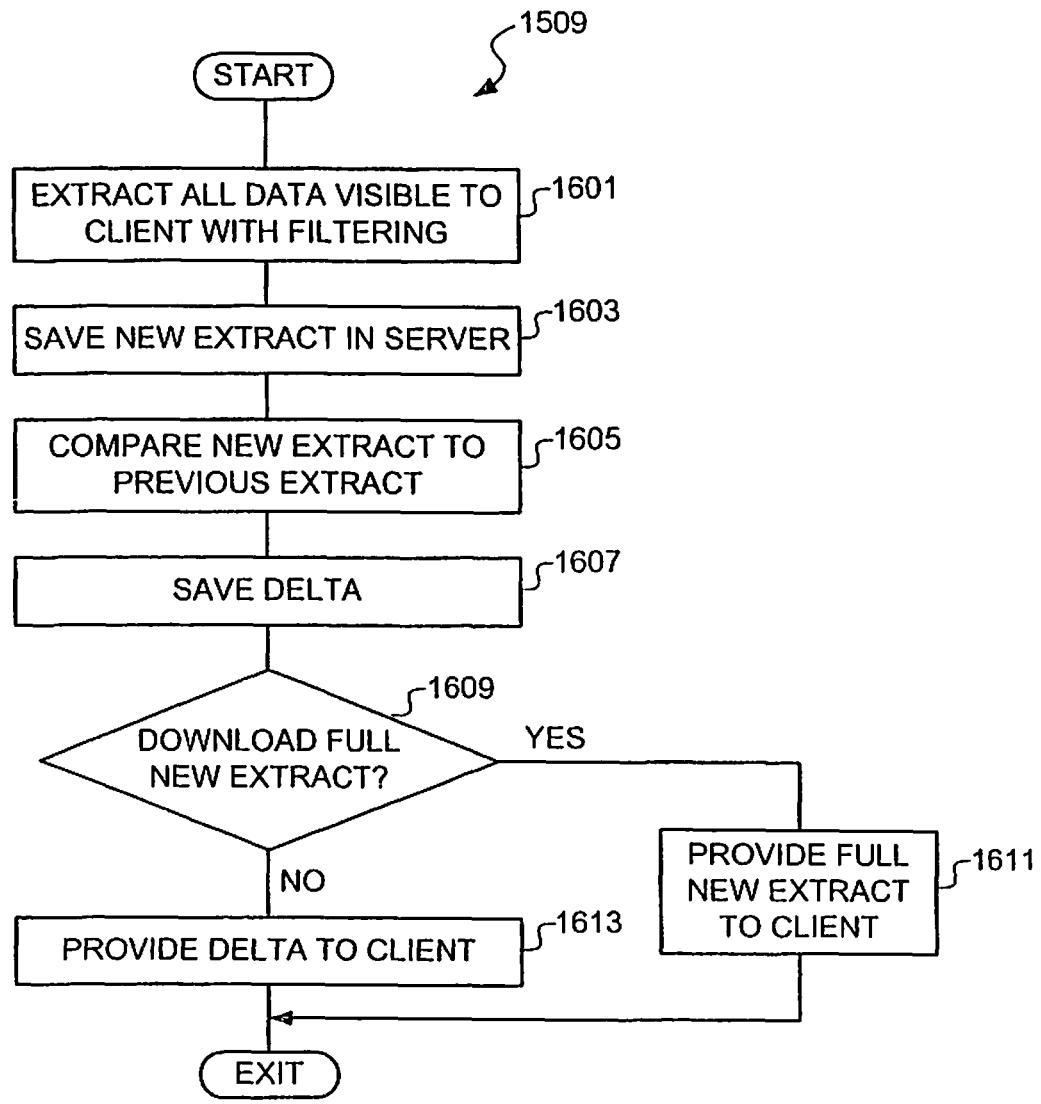
FIG. 16 is a flow diagram illustrating a send database data operation, according to one embodiment of the present invention.

FIG. 16 illustrates block 1509 (FIG. 15), according to one embodiment of the present invention. In this embodiment, a server performs the operations of block 1509. As in the description of FIG. 15, the operation of block 1509 is described in conjunction with handheld device 120-3 (FIG. 4) and server 116 (FIG. 1). However, in light of the present disclosure, those skilled in the art will appreciate that the following description can apply to other types of sync clients without undue experimentation. Referring to FIGS. 4 and 16, block 1509 is performed as follows in this exemplary embodiment.

In a block 1601, server 116 extracts data from main database 112 that is visible to sync client 401. In addition, server 116 may filter this data according to the filter settings provided to server 116 by sync client 401 (described in conjunction with FIGS. 11 and 12).

In a block 1603, server 116 then saves in memory (not shown) a file of the extracted data for later use in a subsequent synchronization operation. In a block 1605, server 116 compares this extract with a file containing extracted data from the previous synchronization operation. Where the data from corresponding database records differ, in a block 1607, server 116 saves the data from newer extract (i.e., the "delta") in another file referred to herein as the delta extract file. In one embodiment, server 116 stores each delta as a record/data pair that sync client 401 can parse from the delta extract when received by sync client 401. In this embodiment, a reserved delimiter separates fields within each record and a different reserved delimiter separates records. In one embodiment, an escape mechanism can be used to allow these reserved delimiters to appear with a record field value. In addition, in some embodiments, the delta extract file may include an indicator for each record/data pair to indicate whether the record was deleted, new, or changed.

In a further refinement, the delta extract is performed on the field level rather than the record level (which may contain several fields) to further reduce the size the delta extract file.

Then in a block 1609, server 116 determines whether to download a full or delta extract to sync client 401. In one embodiment, server 116 would receive a request from sync client 401 for either a full extract or delta extract. As previously described, in one embodiment sync client 401 bases this request on whether an extraction ID downloaded from server 116 matches an extraction ID locally stored by sync client 401. In one exemplary embodiment, if the structure of local database 308 changed (e.g., due to a change in the main database 112 or the visibility rules) since the last synchronization operation, then the extraction IDs would be different and sync client would request a full extract. If the structure of local database 308 has not changed, then the extraction IDs would be the same and sync client 401 would request a delta extract. Depending on the outcome of block 1609, server 116 sends either a full extract or delta extract to sync client 401 in a block 1611 or a block 1613, respectively.

In another embodiment, server 116 can receive the locally stored extraction ID from sync client 401 and compare this received extraction ID with the most recent extraction ID stored in server 116. For example, server 116 can request this data from sync client 401, or this may be part of the data extraction process (e.g., similar to block 1101 of FIG. 10 except that instead of getting the extraction ID, the sync client provides its local extraction ID). Server 116 can then determine whether to download the delta or full extract, as appropriate. For example, server 116 can perform blocks 1301 and 1303 (FIG. 13) instead of sync client 401.

In a similar manner, server 116 can receive the repository ID in determining whether to provide metadata to sync client 401 (e.g. see block 609 of FIG. 6). For example, server 116 can request this data from sync client 401, or this may be part of the data extraction process (e.g., similiar to block 605 of FIG. 6 except that instead of getting the repository ID, the sync client provides its locally stored repository ID). Server 116 can then determine whether to download the metadata. For example, server 116 can be configured to perform blocks 901 and 903 (FIG. 9) instead of sync client 401.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, for purposes of explanation, specific nomenclature may be set forth to provide a thorough understanding of the present invention. However, it will be apparent to one skilled in the art after reading the description that these specific details are not required in order to practice the present invention.

Some portions of the detailed descriptions that follow may be presented in terms of algorithms and symbolic representations of operations on information stored in a computer memory. These algorithmic descriptions and representations can be used by those skilled in the art to convey the substance of their work to others skilled in the art. An algorithm is here, and generally, conceived to be a self-consistent sequence of steps or operations leading to a desired results. These steps or operations may require physical manipulations of physical quantities. Usually, thought not necessarily, these quantities take the form of electrical, magnetic or electromagnetic signals capable of being stored, transferred, combined, compared or otherwise manipulated. These signals are commonly referred to here, and generally, as bits, bytes, words, values, elements, symbols, characters, terms, numbers or the like.

Unless specifically stated otherwise, terms such as "processing", "computing", "calculating", "determining", "displaying" or the like refer to actions and processes of a computer system, or other similar electronic computing device. In particular, these actions and processes manipulate and transform data represented as physical quantities (as described above) within the computer system's registers and memories into other data similarly represented as physical quantities with within the computer system's memories or registers or other information storage, transmission or display devices.

The present invention also relates to one or more apparatus for performing the operations described herein. An apparatus may be specially constructed for the required purposes, or include a general-purpose computer selectively activated or configured by a computer program stored in the computer. Such a computer program may be stored in a computer readable storage medium such as, but not limited to, any type of disk including floppy disks, optical disks, compact disks (CDs) and magnetic-optical disks. Other storage mediums include: read only memories (ROMs) including erasable and electrically erasable programmable ROMs (EPROMs and EEPROMs); random access memories (RAMs) including static and dynamic RAMs; and magnetic or optical cards.

Algorithms and displays presented herein are not inherently related to any particular computer or other apparatus unless specifically stated otherwise. Various general-purpose systems, as well as specialized apparatus, may be used with programs in accordance with the teachings herein. In addition, the present invention is not described with reference to a particular programming language. In light of the present disclosure, those skilled in the art can use a variety of programming languages to implement the teachings of the present disclosure without undue experimentation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   establishing a connection between a server and a synchronization client, wherein
   a handheld device comprises the synchronization client,
   the server comprises a first database,
   the first database comprises a plurality of groups of data, and
   the handheld device comprises a second database;
   receiving, from the synchronization client, filter information, wherein
   the filter information indicates a first group of the plurality of groups of data;
   filtering data from the first database using the filter information to obtain first data, wherein
   the filtering comprises selecting the first group of data in accordance with the filter information; and
   providing the first data to the synchronization client to update the second database, wherein
   the first data comprises the first group of data;
   receiving, from the synchronization client, information of transactions performed on the second database via the handheld device; and
   providing metadata to the synchronization client to update an application on the handheld device when the application has not been updated since a previous synchronization operation.

2. The method of claim 1, further comprising:
   providing to the synchronization client first information indicative of a structure of the first database; and
   determining whether the structure of the first database has been updated since the previous synchronization operation.

3. method of claim 2, wherein the determining whether the structure of the first database has been updated since the previous synchronization operation comprises:
   receiving, from the synchronization client, second information stored on the handheld device that is indicative of the structure of the first database when the previous synchronization operation was performed; and
   comparing the first information with the second information.

4. The method of claim 2, wherein
   the providing the first data comprises:
      providing to the synchronization client second data from the first database when the structure of the first database has not been updated since the previous synchronization operation, wherein
         the second data comprises the first data that was filtered from the first database using the filter information, and
         the second data further comprises data that has changed in the second database since the previous synchronization operation was performed.

5. The method of claim 1, further comprising
   providing to the synchronization client first information indicative of a version of the application, wherein
      the handheld device comprises the application, and
      the application is configured to access the second database; and
   determining whether the application has been updated since the previous synchronization operation.

6. The method of claim 1, wherein the receiving information of transactions performed on the second database comprises:
   providing an identifier of a last received transaction to the synchronization client; and
   receiving, from the synchronization client, transaction information that comprises an identifier for each transaction made after the last received transaction.

7. A non-transitory machine-readable storage medium comprising a plurality of instructions that when executed by a computer cause the computer to perform operations comprising:
   establishing a connection between the computer and a synchronization client, wherein
      a handheld device comprises the synchronization client,
      the computer comprises a first database,
      the first database comprises a plurality of groups of data, and the handheld device comprises a second database;
receiving, from the synchronization client, filter information, wherein
the filter information indicates a first group of the plurality of groups of data;
filtering data using the filter information to obtain first data, wherein
the filtering comprises selecting the first group of data in accordance with the filter information; and
providing the first data to the synchronization client to update the second database, wherein
the first data comprises the first group of data;
receiving, from the synchronization client, information of transactions performed on the second database via the handheld device; and
providing metadata to the synchronization client to update an application on the handheld device when the application has not been updated since a previous synchronization operation.

8. The non-transitory machine-readable storage medium of claim 7, wherein the operations further comprise:
providing to the synchronization client first information indicative of a structure of the first database; and
determining whether the structure of the first database has been updated since a previous synchronization operation.

9. The non-transitory machine-readable storage medium of claim 8, wherein the operations further comprise:
receiving, from the synchronization client, second information stored on the handheld device that is indicative of the structure of the first database when the previous synchronization operation was performed; and
comparing the first information with the second information.

10. The non-transitory machine-readable storage medium of claim 8, wherein the providing the first data further comprises:
providing to the synchronization client a first set of filtered data from the first database when the structure of the first database has been updated since the previous synchronization operation, wherein
the first set of data comprises data that has changed in the second database since the previous synchronization operation was performed.

11. The non-transitory machine-readable storage medium of claim 8, wherein the operations further comprise:
providing to the synchronization client a second set of filtered data from the first database when the structure of the first database has not been updated since the previous synchronization operation, wherein
the second set of data comprises data from the second database that has changed since the previous synchronization operation was performed.

12. The non-transitory machine-readable storage medium of claim 7, wherein the operations further comprise:
providing to the synchronization client first information indicative of a version of the application, wherein
the handheld device comprises the application, and
the application allows access to the second database; and
determining whether the application has been updated since the previous synchronization operation.

13. The non-transitory machine-readable storage medium of claim 7, wherein the operations further comprise:
providing an identifier of a last received transaction to the synchronization client; and
receiving, from the synchronization client, transaction information comprising an identifier for each transaction made after the last received transaction.

14. A system comprising:
a main database;
a transaction processor coupled to the main database, wherein
the transaction processor is configured to receive information during a synchronization operation from a synchronization client,
the information relates to transactions performed on a local database via a handheld device comprising the local database, and
the transaction processor is further configured to perform the transaction on the main database using the information; and
a data extractor coupled to the main database, wherein
the data extractor is configured to receive, from the synchronization client, filter information, and
the filter information indicates a first group of a plurality of groups of data,
the data extractor is further configured to provide first data during the synchronization operation to the synchronization client using the filter information,
the first data comprises the first group of data;
a module for providing metadata to the synchronization client to update an application on the handheld device when the application has not been updated since a previous synchronization operation.

15. The system of claim 14, wherein the data extractor is further configured to determine whether a structure of the main database has been changed since the previous synchronization operation.

16. The system of claim 14, wherein the data extractor is further configured to store the extracted data provided to the synchronization client.

17. The system of claim 14, wherein
the data extractor is further configured to provide a first set of data extracted from the main database when the structure of the main database has changed since the previous synchronization operation, and
the first set of data comprises data that has not changed in the main database since the previous synchronization operation was performed.

18. The method of claim 1, further comprising:
receiving a first transaction from the handheld device;
receiving a second transaction from a second handheld device, wherein
the second transaction conflicts with the first transaction; and
modifying one or more portions of the second transaction, wherein
the modifying eliminates a conflict with the first transaction.

19. The method of claim 1, wherein
the first data comprises data from the first database that is visible by the handheld device, and
the first database comprises other data that is not visible by the handheld device.

20. The method of claim 1, further comprising:
the server verifying the filter information to ensure the filter settings are proper, wherein
the verifying is performed prior to the filtering.

21. The method of claim 1, further comprising:
providing initial filter information to the synchronization client, wherein the providing the initial filter information is performed prior to the receiving the filter information, and the filter information is configured to be updated using the initial filter information.

* * * * *

UNITED STATES PATENT AND TRADEMARK OFFICE
CERTIFICATE OF CORRECTION

Page 1 of 1

PATENT NO. : 8,533,154 B2
APPLICATION NO. : 11/753290
DATED : September 10, 2013
INVENTOR(S) : Huang et al.

It is certified that error appears in the above-identified patent and that said Letters Patent is hereby corrected as shown below:

Title Page, item (56), column 1, under Related U.S. Application Data, line 3, Delete "09/282,001," and insert -- 09/967,439, --, therefor.

In the Specification
In column 2, line 1, delete "DESCRIPTION" and insert -- BRIEF DESCRIPTION --, therefor.

In column 9, line 60, delete "(e.g." and insert -- (e.g., --, therefor.

In column 10, line 57, delete "fill" and insert -- full --, therefor.

In column 11, line 35, delete "(ie.," and insert -- (i.e., --, therefor.

In column 13, line 40, delete "lDs" and insert -- IDs --, therefor.

In column 14, line 64, delete "transfer" and insert -- transfer or --, therefor.

In column 15, line 67, delete "(e.g." and insert -- (e.g., --, therefor.

In column 16, line 10, delete "120-3" and insert -- 120-3. --, therefor.

In column 16, line 26, delete "11 03," and insert -- 1103, --, therefor.

In column 19, line 8, delete "fill" and insert -- full --, therefor.

In column 20, line 39, delete "(e.g." and insert -- (e.g., --, therefor.

In column 22, line 36, delete "similiar" and insert -- similar --, therefor.

In column 22, line 65, delete "results." and insert -- result. --, therefor.

In column 22, line 67, delete "thought" and insert -- though --, therefor.

In the Claims
In column 24, line 21, in Claim 3, delete "method" and insert -- The method --, therefor.

Signed and Sealed this
Thirty-first Day of December, 2013

Margaret A. Focarino
*Commissioner for Patents of the United States Patent and Trademark Office*